US012750834B1

(12) United States Patent
Rofougaran et al.

(10) Patent No.: US 12,750,834 B1
(45) Date of Patent: Sep. 29, 2026

(54) WIRELESS COMMUNICATION DEVICE AND METHOD FOR SPECTRUM MONITORING BASED ON DYNAMIC CONFIGURATION OF RF FRONT-END

(71) Applicant: PELTBEAM INC., Sherman Oaks, CA (US)

(72) Inventors: Ahmadreza Rofougaran, Newport Beach, CA (US); Mehdi Hatamian, Mission Viejo, CA (US); Shervin Alireza Odabaee, Newport Coast, CA (US); Arman Rofougaran, Newport Coast, CA (US); Milan Rofougaran, Newport Coast, CA (US); Kavian Odabaee, Newport Coast, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 0 days.

(21) Appl. No.: 19/568,850

(22) Filed: Mar. 17, 2026

Related U.S. Application Data

(63) Continuation of application No. 19/333,433, filed on Sep. 19, 2025, now Pat. No. 12,684,548.

(51) Int. Cl.
*H04W 72/0453* (2023.01)

(52) U.S. Cl.
CPC ............................... *H04W 72/0453* (2013.01)

(58) Field of Classification Search
CPC ................................................. H04W 72/0453
See application file for complete search history.

(56) References Cited

U.S. PATENT DOCUMENTS

| | | | |
|---|---|---|---|
| 8,805,291 | B1 | 8/2014 | Garcia et al. |
| 8,958,764 | B1 | 2/2015 | Xu et al. |
| 10,498,371 | B1 | 12/2019 | Parikh et al. |
| 2013/0043946 | A1 | 2/2013 | Hadjichristos et al. |

(Continued)

FOREIGN PATENT DOCUMENTS

CA 3027586 A1 6/2019

OTHER PUBLICATIONS

Non-Final Office Action of related U.S. Appl. No. 19/329,699 mailed Dec. 4, 2025.

(Continued)

*Primary Examiner* — Marisol Figueroa
(74) *Attorney, Agent, or Firm* — CHIP LAW GROUP

(57) ABSTRACT

A method for spectrum monitoring includes capturing radio frequency (RF) signals using a multiple-input-multiple-output (MIMO) antenna array in a wireless communication device. Band-specific filtering is applied to the captured RF signals before digitization to isolate signals of interest. Spectral analysis is performed on the signals of interest using Fast Fourier Transform (FFT) and wavelet transforms to extract frequency-domain features. Multi-dimensional analysis combining spectral, temporal, and spatial processing is applied on the frequency-domain features to extract features. The extracted features are compared against characteristic patterns of known signal types in a pattern recognition database. An artificial neural network (ANN) model is executed on the extracted features to determine a signal classification when the extracted features do not belong to the characteristic patterns of the known signal types in the pattern recognition database.

20 Claims, 9 Drawing Sheets

(56) References Cited

U.S. PATENT DOCUMENTS

| | | | | |
|---|---|---|---|---|
| 2016/0127392 | A1* | 5/2016 | Baxley | G06V 20/41<br>726/23 |
| 2022/0269958 | A1* | 8/2022 | Ahmed | G06N 20/00 |
| 2023/0177122 | A1* | 6/2023 | Hwang | G06F 18/241 |
| 2025/0351175 | A1 | 11/2025 | Mehrnoush et al. | |

OTHER PUBLICATIONS

Notice of Allowance of related U.S. Appl. No. 19/333,433 mailed Dec. 31, 2025.
Notice of Allowance of related U.S. Appl. No. 19/329,699 mailed Feb. 3, 2026.
Notice of Allowance of U.S. Appl. No. 19/333,433, dated Feb. 24, 2026.

* cited by examiner

WIRELESS COMMUNICATION DEVICE AND METHOD FOR SPECTRUM MONITORING BASED ON DYNAMIC CONFIGURATION OF RF FRONT-END

CROSS-REFERENCE TO RELATED APPLICATIONS/INCORPORATION BY REFERENCE

This patent application makes reference to, claims priority to, claims the benefit of, and is a Continuation Application of U.S. patent application Ser. No. 19/333,433, filed on Sep. 19, 2025.

This application makes reference to U.S. application Ser. No. 19/329,699.

The above reference applications are hereby incorporated herein by reference in its entirety.

FIELD OF TECHNOLOGY

Certain embodiments of the disclosure relate to wireless communication devices and spectrum monitoring systems. More specifically, certain embodiments of the disclosure relate to a wireless communication device and a method for spectrum monitoring based on the dynamic configuration of radio frequency (RF) front-end.

BACKGROUND

The rapid growth of wireless communication technologies and the increasing demand for high-bandwidth applications have led to significant challenges in the current spectrum management landscape. It is known that radio monitoring is the basis of spectrum management. Spectrum monitoring helps spectrum regulators to plan and use frequencies, avoid incompatible usage, and identify sources of harmful interference. It is a growing problem due to the growing number of RF spectrum uses. Equipment such as spectrum analyzers are useful tools for analyzing and monitoring radio frequency (RF) signals. These instruments are useful for wireless communications testing, ensuring regulatory compliance, and troubleshooting RF interference. Spectrum analyzers play vital roles in RF design, testing, and electronic circuit development. Conventional spectrum analyzers, while effective to a certain extent, face several limitations. Currently, there are many technical challenges in effective spectrum monitoring and signal analysis across multiple frequency bands in increasingly congested electromagnetic environments. For example, high-end analyzers capable of monitoring frequencies up to 80+ GHz can cost between $1-2 million per unit, with even lower frequency models (4-5 GHz) ranging from $15,000-50,000. This significant cost barrier prevents the widespread deployment of spectrum monitoring systems, particularly in applications requiring multiple monitoring points.

Current spectrum analysis solutions generally fall into two categories: swept and real-time analyzers. Swept analyzers operate by sequentially scanning frequency ranges, introducing dead time between sweeps that can miss intermittent signals. Real-time analyzers offer faster acquisition but require complex and expensive hardware for concurrent Fast Fourier Transform (FFT) processing. Both approaches typically demand dedicated hardware for different frequency bands, further increasing system complexity and cost. These limitations become particularly problematic in modern wireless environments characterized by, for example: (a) increasing spectrum congestion from proliferating wireless devices; (b) growing deployment of autonomous systems requiring reliable communication; (c) need for reliable interference detection and mitigation; (d) requirements for spatial awareness and signal source location; and (e) complex signal environments requiring advanced pattern recognition. With conventional systems, while traditional software-defined radio (SDR) solutions offer more flexibility, they often have restricted frequency spans and insufficient processing capability for advanced signal analysis. Additionally, conventional analyzers struggle with limited spatial awareness, making it difficult to locate and characterize signal sources in complex environments. In another example, there is a form factor constraint with traditional systems used for spectrum monitoring. Traditional benchtop units require significant space while portable units sacrifice functionality for mobility.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A wireless communication device and a method for spectrum monitoring based on dynamic configuration of radio frequency (RF) front-end, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
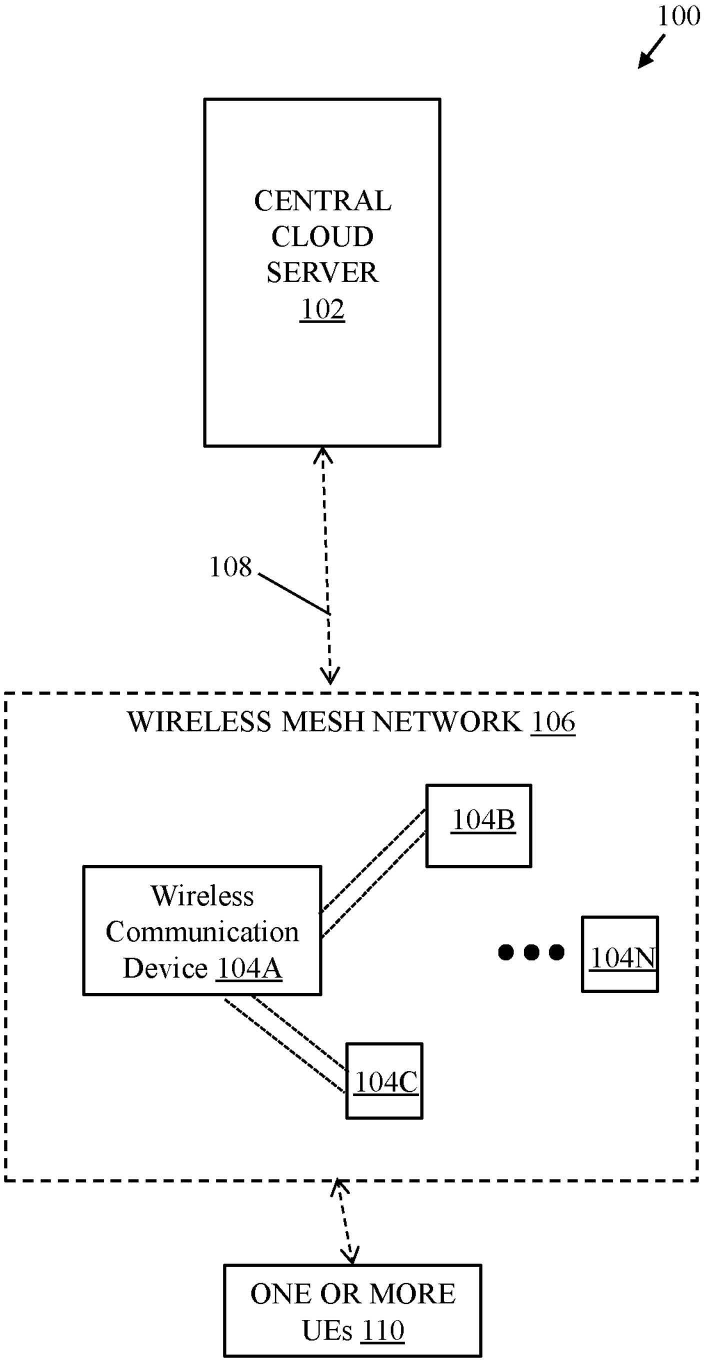
FIG. 1 is a diagram that illustrates an exemplary system for spectrum monitoring, in accordance with an exemplary embodiment of the disclosure.

Certain embodiments of the disclosure may be found in a wireless communication device and a method for spectrum monitoring based on the dynamic configuration of a radio frequency (RF) front-end.

Conventional wireless spectrum monitoring systems face significant limitations when analyzing signals across multiple frequency bands. For example, there is an inherent bottleneck in traditional spectrum monitoring systems where signal acquisition and signal analysis compete for the same processing resources, causing either missed signals during analysis periods or delayed analysis (i.e., blind spots) that render detection ineffective when analyzing signals across multiple frequency bands. Further, the challenge becomes amplified if a wireless chipset (e.g., a commercial wireless communication hardware like a Wi-Fi® 7 chipset) is to be used or adapted to perform advanced spectrum monitoring. In other words, the challenge lies in how to utilize and modify a commercial WLAN chipset (e.g., IEEE 802.11be chipset and modems) to achieve wide frequency range coverage (DC to 300 GHz) in a cost-effective manner while still avoiding any blind spots during signal acquisition and signal analysis.

In another example, conventional spectrum monitoring systems face technical challenges when attempting to adapt to dynamically changing radio frequency environments. For example, when monitoring a frequency band for potential security threats, a traditional system might detect an unusual signal pattern that requires more detailed analysis. To properly characterize this signal, the conventional system may need to configure its radio frequency parameters, such as changing sampling rates, or modifying detection thresholds. However, during this configuration process, the monitoring system may temporarily pause its signal acquisition and analysis operations, creating a monitoring gap lasting anywhere from milliseconds to seconds. This technical limitation may create an unwanted vulnerability as during these blind spots, intermittent or frequency-hopping signals may transmit without detection. Consider a scenario where a security system may monitor for unauthorized transmissions in a restricted area. Upon detecting a potential threat signal, the system may pause briefly or reconfigure to better analyze this signal, but during this period, the very transmitter being monitored might change frequencies or transmit critical data, thereby completely evading detection due to the monitoring gap. Additionally, most existing systems use static operational parameters that may not adapt to dynamic RF environments, resulting in either missed detections or excessive false alarms as conditions change. Furthermore, current systems typically process each frequency band in isolation, creating detection gaps for sophisticated signals like frequency-hopping transmitters or coordinated multi-band jammers.

In contrast to conventional systems and devices, the disclosed wireless communication device and method establishes a complete feedback loop system that continuously evolves its monitoring capabilities without compromising coverage. By utilizing a hardware interrupt-driven approach, the disclosed wireless communication device may respond immediately to defined spectrum events, which ensures that time-critical signals are captured and processed without delay. The disclosed wireless communication device may include one or more antenna arrays configured to receive radio frequency (RF) signals across a plurality of frequency bands, for example, DC to 300 GHz, without requiring multiple dedicated receivers, enabling efficient monitoring across diverse frequency ranges concurrently. The disclosed wireless communication device may be configured to adjust a plurality of operational parameters of its RF front-end to process the received RF signals to obtain digitized down-converted signals that comprise spectrum data. The disclosed wireless communication device may configure the RF front-end to generate a hardware interrupt signal when a defined spectrum monitoring event is detected. Based on the hardware interrupt signal, the disclosed wireless communication device may initiate a first processing path configured to transfer spectrum data to the memory of the wireless communication device via a direct memory access (DMA) operation and manage circular buffers in the memory for the spectrum data. Further, the disclosed wireless communication device may concurrently initiate a second processing path configured to perform signal analysis on the spectrum data and extract spectral features. By separating the spectrum data acquisition path from the signal analysis path and executing them concurrently, the disclosed wireless communication device eliminates the traditional bottleneck where systems must choose between continuous monitoring or thorough analysis. The first processing path's DMA operations efficiently transfer spectrum data to the memory with minimal CPU involvement, while the dedicated circular buffer architecture ensures continuous data capture without interruption, even during intensive analysis operations.

The disclosed wireless communication device may further achieve technical efficiency through its prioritization mechanism, where processing resources may be allocated based on signal characteristics rather than treating all detected signals equally. This ensures that potentially useful or critical signals receive immediate analysis while less significant signals are processed according to available resources, optimizing computational efficiency. Furthermore, the disclosed wireless communication device may implement a dynamic reconfiguration capability where operational parameters of the RF front-end are automatically re-adjusted based on classification results. This creates an adaptive monitoring system that continuously optimizes its detection parameters based on the actual RF environment it encounters, without requiring manual intervention or creating monitoring gaps. The continuous feedback loop between signal detection, classification, and parameter adjustment enables the device to progressively improve its monitoring effectiveness for specific signal types of interest while maintaining uninterrupted spectrum coverage.

Furthermore, conventional systems and devices (e.g. conventional spectrum analyzers) manifest hardware complexity, such as multiple dedicated radio frequency (RF) front ends for different frequency bands, expensive analog-to-digital converters (ADCs) for high-bandwidth signal capture (e.g., >7 GHz), and complex signal processing hardware driving high spectrum analyzer costs. In contrast to conventional systems and devices (e.g. conventional spectrum analyzers) requiring dedicated hardware for different frequency bands, embodiments herein advantageously utilize and adapt commercial WLAN chipsets (e.g., IEEE 802.11 be chipset and modems) with intelligent signal down conversion and signal processing architectures to achieve wide frequency range coverage (DC to 300 GHz) in a cost-effective manner.

FIG. 1 is a diagram that illustrates an exemplary network environment of a system for adaptive radio frequency (RF) spectrum analysis, in accordance with an exemplary embodiment of the disclosure. With reference to FIG. 1, there is shown a system 100 for enhanced spectrum sensing across multiple frequency bands. The system 100 may include a central cloud server 102, a plurality of wireless communication devices, such as wireless communication devices 104A, 104B, 104C, . . . , 104N. In an implementation, the wireless communication devices 104A, 104B, 104C, . . . , 104N may be interconnected with each other in a wireless mesh network 106. In another implementation, each of the wireless communication devices 104A, 104B, 104C, . . . , 104N may function independently as a standalone device for enhanced spectrum sensing across multiple frequency bands or may work in cooperation with each other for not only enhanced spectrum sensing across multiple frequency bands but also wireless data communication and routing across the wireless mesh network 106. In an implementation, the wireless communication devices 104A, 104B, 104C, . . . , 104N may be further communicatively coupled to the central cloud server 102, via a communication network 108. There is further shown one or more user equipment (UEs) 110 that may be wirelessly connected to one or more network nodes in the wireless mesh network 106.

The central cloud server 102 includes suitable logic, circuitry, and interfaces that may be configured to communicate with the wireless communication devices 104A, 104B, 104C, . . . , 104N (may also be referred to as network nodes or mesh nodes). In an implementation, the central cloud server 102 may be communicatively coupled to each network node, including one or more UEs 110. In an example, the central cloud server 102 may be a remote management server that is managed by a third party different from the service providers associated with the plurality of different wireless carrier networks (WCNs), service providers or spectrum owners. In another example, the central cloud server 102 may be a remote management server or a data center that is managed by a third party, jointly managed, or managed in coordination and association with one or more of the plurality of different WCNs or different service providers.

The wireless communication devices 104A, 104B, 104C, . . . , 104N may also be referred to as mesh nodes when connected to each other in the wireless mesh network 106. Each of the wireless communication devices 104A, 104B, 104C, . . . , 104N, may be configured to capture and monitor raw RF signals from direct current (DC, i.e. 0 hertz (Hz)) to 300 Gigahertz (GHz) and analyze the captured RF signals. Each of the wireless communication devices 104A, 104B, 104C, . . . , 104N may be a multi-functional device for spectrum-sensing across a plurality of frequency bands (DC to 300 GHz) as well as wireless data communication to one or more other wireless communication devices in the wireless mesh network 106. Examples of the wireless communication devices 104A, 104B, 104C, . . . , 104N may include but is not limited to a wide-range spectrum monitoring device or a special dual-purpose device for spectrum sensing and wireless data communication, a modified repeater device, or a 5G backplane system.

The wireless mesh network 106 may be a resilient, high-capacity wireless network that extends the reach of a fiber backbone to provide widespread coverage to end users, such as the one or more UEs 110 via the wireless communication devices 104A, 104B, 104C, . . . , 104N. The fiber backbone (not shown) may be a high-performance, fiber-optic core network infrastructure that connects central offices, data centers, and the wireless mesh network 106. The fiber backbone may aggregate traffic from the central offices and data centers and provide seamless integration between the fiber and wireless network components.

The communication network 108 may refer to the infrastructure and protocols enabling secure data exchange between the wireless communication devices 104A, 104B, 104C, . . . , 104N and the central cloud server 102 through one or more known wireless transmission mediums.

The one or more UEs 110 may correspond to a wireless communication device, such as a client device or telecommunication hardware used by an end-user to communicate. Some of the one or more UEs 110 may refer to a combination of a mobile equipment and subscriber identity module (SIM). Examples of the one or more UEs 110 may include, but are not limited to a smartphone, a laptop, a desktop machine, a customer premise equipment, a virtual reality headset, an augmented reality device, a wireless modem, a home router, a Wi-Fi® enabled smart television (TV) or set-top box, a VoIP station, or any other customized hardware for wireless communication.

The various operations of the disclosed system 100 may be explained by taking an example of one wireless communication device, such as the wireless communication devices 104A. It is to be understood that operations described for the wireless communication device 104A may be applicable to other wireless communication devices 104B, 104C, . . . , 104N. For example, each of the wireless communication devices 104A, 104B, 104C, . . . , 104N may be configured to perform wideband spectrum monitoring with high sensitivity and dynamic range while intelligently utilizing the processing capabilities of a commercial WLAN chipset (e.g., IEEE 802.11be chipset and modems) modified for signal monitoring with intelligent signal down conversion and signal processing architectures to achieve wide frequency range coverage (DC to 300 GHz) in a cost-effective manner.

Typically, IEEE 802.11be/ax (Wi-Fi® 7/6E) hardware is conventionally designed for high-throughput wireless networking, operating in 2.4 GHz, 5 GHz, and 6 GHz bands. It provides features like multi-link operation (MLO), 320 MHz channels, 4K Quadrature Amplitude Modulation (QAM) modulation, and multi-user Multiple-Input Multiple-Output (MIMO) primarily for data communication between access points and client devices.

The present disclosure intelligently modifies and repurposes IEEE 802.11be/ax hardware beyond its standard networking role by integrating wideband spectrum monitoring capabilities. In an example, the wireless communication device 104A may leverage the hardware's advanced signal processing capabilities while extending frequency coverage to DC to 300 GHz (otherwise primary coverage is only frequency range of 1-7 GHz and that too not for spectrum monitoring purpose). This adaptation enables concurrent operation as a wireless networking device and a spectrum monitoring platform, utilizing features like MLO and high-speed signal processing for signal detection, classification, and analysis across a significantly broader range than traditional Wi-Fi® operations. The wireless communication device 104A maintains networking functionality in the system 100 while adding capabilities for detecting different types of signal sources, such as legitimate signal sources, signal jamming sources, unknown signal sources, and moving interference sources.

Beneficially, each of the wireless communication devices 104A, 104B, 104C, . . . 104N intelligently modifies and repurposes IEEE 802.11be/ax hardware beyond its standard networking role to implement a continuous spectrum monitoring system that maintains uninterrupted signal acquisition while concurrently performing advanced signal analysis and dynamic parameter reconfiguration, enabling detection of complex signal types that would typically require dedicated spectrum analysis equipment with limited use. Each of the wireless communication devices 104A, 104B, 104C, . . . , 104N may implement dynamic RF front-end reconfiguration based on real-time signal classification results, enabling adaptive parameter optimization for specific signal types without creating monitoring gaps that typically occur in conventional spectrum analysis systems during configuration or reconfiguration periods.

Figure 2:
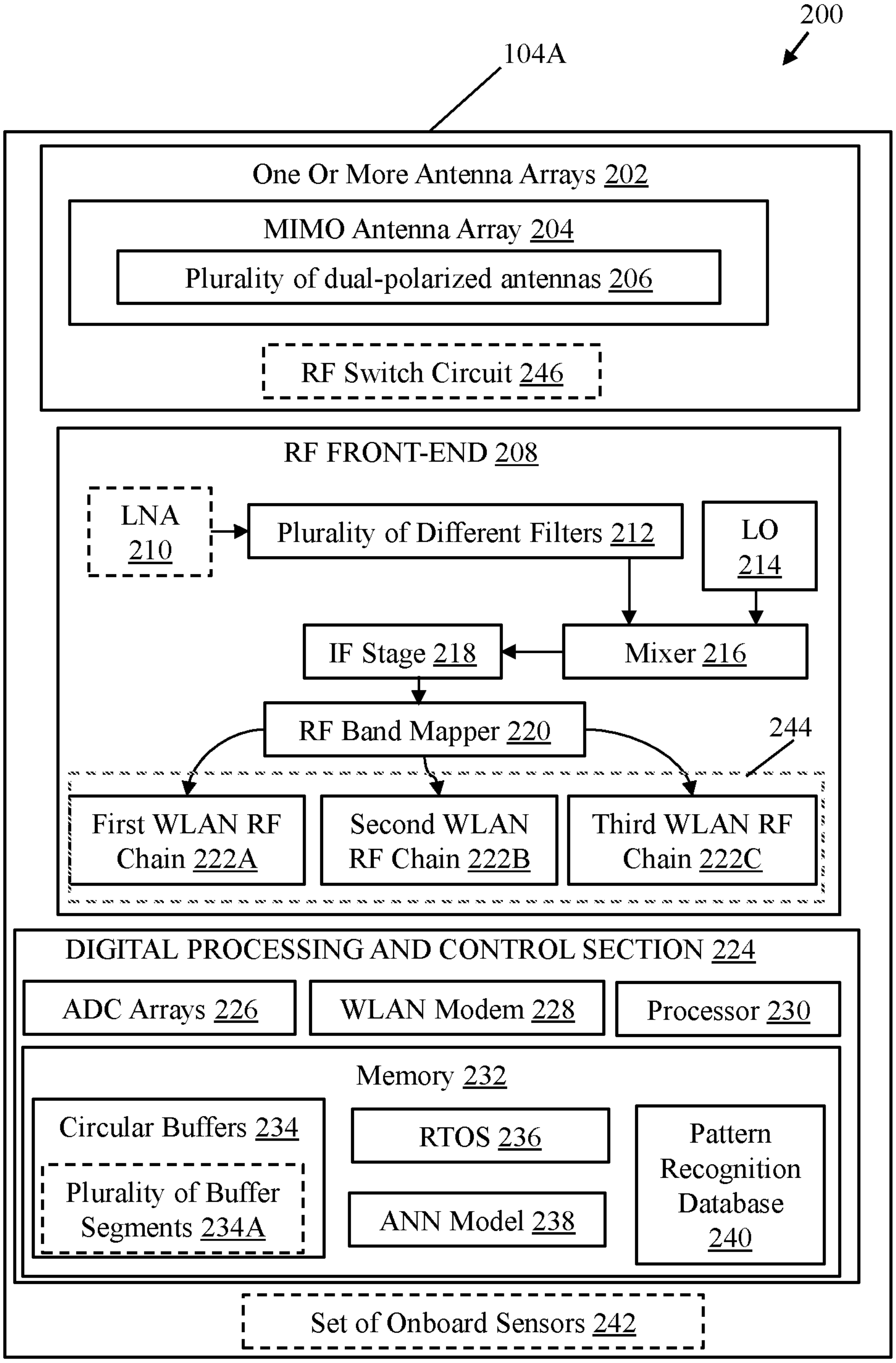
FIG. 2 is a block diagram that illustrates various components of an exemplary wireless communication device for spectrum monitoring, in accordance with an exemplary embodiment of the disclosure.

FIG. 2 is a block diagram that illustrates various components of an exemplary wireless communication device for spectrum monitoring, in accordance with an exemplary embodiment of the disclosure. FIG. 2 is explained in conjunction with elements from FIG. 1. With reference to FIG. 2, there is shown a block diagram 200 of the wireless communication device 104A.

The wireless communication device 104A may include an antenna array system, such as one or more antenna arrays 202. The one or more antenna arrays 202 may include a multiple-input-multiple-output (MIMO) antenna array 204. The MIMO antenna array 204 may include a plurality of dual-polarized antennas 206. In an implementation, the antenna array system may include a radio frequency (RF) switch circuit 246. The wireless communication device 104A may include an RF front-end 208 and a digital processing and control section 224.

The RF front-end 208 may include a Low-Noise Amplifier (LNA) 210, a plurality of different filters 212, a local oscillator 214, a mixer 216, an intermediate frequency (IF) stage 218, an RF band mapper 220, a WLAN radio (e.g., an IEEE 802.11 be radio) comprising distinct RF chains for concurrent operations across different frequency bands, such as a first WLAN radio chain 222A (e.g., RF chain 1 for 2.4 GHz band processing), a second WLAN radio chain 222B (e.g., RF chain 2 for 5 GHz band processing), and a third WLAN radio chain 222C (e.g., RF chain 3 for 6 GHz band processing). Each chain may comprise dedicated components (LNA, mixers, filters) optimized for its specific frequency band, enabling concurrent multi-band operation (not shown for the sake of brevity).

The digital processing and control section 224 may be configured to handle digital processing (e.g., analog to digital conversions, digital signal processing, multi-link operations (MLO) processing, baseband processing etc.), WLAN modem functions, as well as system control functions (e.g., a system on a chip (Soc)). The digital processing and control section 224 may include ADC arrays 226, a WLAN modem 228, a processor 230, and a memory 232. The memory 232 may be configured to store the circular buffers 234, a real-time operating system (RTOS) 236, an artificial neural network (ANN) model 238, and a pattern recognition database 240. In an implementation, the wireless communication device 104A may further include a set of onboard sensors 242.

The one or more antenna arrays 202 may be configured to receive radio frequency (RF) signals across a plurality of frequency bands, for example, ranging from direct current (DC) to 300 GHz. The one or more antenna arrays 202 may include the MIMO antenna array 204. In an implementation, the one or more antenna arrays 202 may include the MIMO antenna array 204 and a wideband antenna array. The MIMO antenna array 204 may include the plurality of dual-polarized antennas 206 configured to receive radio frequency signals in vertical and horizontal polarizations across the plurality of frequency bands, for example, ranging from direct current (DC) to 300 GHz. The MIMO antenna array 204 may incorporate dedicated MIMO elements for 2.4/5/6/7 GHz Wi-Fi® bands and wideband elements for full spectrum coverage enabling comprehensive spectrum sensing capabilities across multiple frequency bands (i.e., not only supports primary coverage from 1-7 GHz but manifest extended range capability to DC-300 GHz through multi-stage conversion operations).

The RF front-end 208 may be configured to apply band-specific filtering operation to the received radio frequency signals to isolate signals-of-interest with at least 50-80 decibels of spurious signal suppression. In an implementation, the RF front-end 208 may maintain a noise figure below 3 decibels and phase noise performance of −110 dBc/Hz at 10 kHz offset with dynamic range exceeding 90 decibels. The RF front-end 208 may comprise low noise amplification stages, pre-filtering components, first stage mixing with local oscillator, and initial intermediate frequency stage processing.

The RF band mapper 220 may be configured to perform mapping of received radio frequency signals to predefined intermediate frequencies (e.g., 2.4 GHz, 5 GHz, or 6 GHz). The RF band mapper 220 may enable concurrent processing of signals across multiple frequency bands. The RF band mapper 220 may perform demultiplexing of signals into WLAN bands (Wi-Fi® bands) and provide dedicated signal paths for 2.4/5/6 GHz processing with multi-stage frequency conversion.

The ADC arrays 226 may refer to analog-to-digital converter arrays configured to digitize the down-converted signals for processing. The WLAN modem 228 may refer to a wireless local area network modem configured to handle baseband signal processing, including digital processing operations such as Fast Fourier Transform (FFT)/Inverse Fast Fourier Transform (IFFT), signal equalization, Medium Access Control (MAC) layer processing, and Quality of Service (QoS) management.

The processor 230 may be configured to execute spectrum analysis, signal classification, and cross-band correlation across multiple intermediate frequency bands (e.g., 5 GHz and 6 GHz). The processor 230 may be part of Soc and may incorporate one or more processing units, including Central Processing Unit (CPU), Neural Processing Unit (NPU), and Digital Signal Processor (DSP) for specialized signal processing tasks.

The memory 232 may refer to a storage configured to store processing data and signal patterns. The memory 232 may provide a hierarchical memory architecture for efficient data access and processing. Examples of implementation of the memory 232 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read-only memory (ROM), a hard disk drive (HDD), a secure digital (SD) card, a flash drive, cache memory, and/or other non-volatile memory.

The memory 232 may be configured to store the circular buffers 234. The circular buffers 234 may include a plurality of buffer segments 234A. The circular buffers 234 may be configured as a series of contiguous memory segments, such as the plurality of buffer segments 234A, which may be arranged in a circular sequence where the last segment is logically linked back to the first segment. Each buffer segment may be sized appropriately for the bandwidth being monitored. For example, for the extensive DC to 300 GHz monitoring range, the plurality of buffer segments 234A may be sized according to the bandwidth requirements of specific frequency bands, such as 256 KB-1 MB for narrowband monitoring (<10 MHz bandwidth), 1 MB-4 MB for standard bandwidth monitoring (10-100 MHz), 4 MB-16 MB for wideband monitoring (100-320 MHz), and 16 MB-32 MB for ultra-wideband monitoring (>320 MHz). 4-8 buffer segments may be implemented in rotation, with segment count and size dynamically adjusted based on available memory resources and the specific monitoring task's requirements for capture duration and signal density analysis. The circular buffers 234 may enable continuous spectrum data capture by allowing the direct memory access (DMA) controller to write incoming data to one segment while signal processing functions read from another segment. When a buffer segment becomes full, the DMA controller may automatically wrap around to the next available segment without interrupting the data acquisition process. This architecture may prevent data loss during intensive processing operations and ensure that no transient signals are missed, regardless of their duration or timing. The circular buffers 234 implementation may be managed through buffer descriptor tables that track the status of each segment as it progresses through states including "EMPTY", "FILLING", "FULL", and "PROCESSING", enabling efficient coordination between the data acquisition and signal analysis processing paths.

The real-time operating system (RTOS) 236 may be implemented as specialized firmware that may provide deterministic task scheduling with strict timing guarantees. The RTOS 236 may manage concurrent execution of spectrum monitoring tasks, signal processing tasks, and interrupt service tasks with different priority levels, enabling the wireless communication device 104A to maintain uninterrupted spectrum monitoring while handling time-critical processing operations.

The ANN model 238 may be a trained machine learning system implemented within the wireless communication device 104A that provides signal classification capabilities for advanced or previously unknown signal types. When conventional pattern-matching operations may not identify a detected signal, the ANN model 238 may analyze the extracted spectral features to determine the most likely signal classification, enabling the wireless communication device 104A to adapt to new or modified signal types encountered in the RF spectrum. In an implementation, the ANN model 238 may be implemented as an edge ANN model that may interact with another ANN model in the central cloud server 102.

The pattern recognition database 240 may refer to a database system configured to maintain historical signal correlation patterns and update correlation thresholds based on pattern recognition results, enabling adaptive learning and pattern evolution tracking. The pattern recognition database 240 may store characteristic patterns of known signal types used during the signal classification operations. Each pattern may include multiple feature vectors representing the expected spectral, temporal, and modulation characteristics of specific signal types. The pattern recognition database 240 may be loaded during system initialization and accessed, for example, during signal classification to match extracted spectral features against known patterns, enabling rapid identification of common signal types before employing more computationally intensive classification operations.

The set of onboard sensors 242 refers to environmental and operational sensors configured to provide supplementary data to support signal classification and threat assessment capabilities, where the sensors enable enhanced contextual awareness for signal processing decisions. For example, the set of onboard sensors 242 may include one or more image sensors, a lidar sensor, a Radar, a spatial position sensor, an inertial measurement unit (IMU) sensor, and a temperature sensor. A wide range of sensors may be integrated or connected to enrich each wireless communication device 104A with environmental awareness for intelligent intra-node and inter-node optimizations. For example, one or more image sensors may be used to visually monitor the surroundings of each network node. The lidar sensor may be referred to as a light detection and ranging sensor used to enable accurate three-dimensional (3D) profiling and depth perception of the surroundings of each network node for precise beam alignment. The Radar may be a built-in radar to detect and track motion to monitor movement patterns of surrounding objects and predict potential RF signal blockers. The spatial position sensor may be a global navigation satellite system (GNSS) sensor, such as a global positioning system (GPS), to provide location awareness for each network node used for geospatial analytics and positioning capabilities. The IMU sensor may include a combination of accelerometers, gyroscopes, and magnetometers (sometimes magnetometers may not be used) that typically measure the body's specific force, angular rate, and orientation of a given body. In this case, such raw IMU output may be processed to measure node vibrations, shocks, and orientation changes at each network node.

The WLAN radio 244 may be a part of a WLAN chipset. The WLAN radio 244 may include distinct RF chains for concurrent operations across different frequency bands, such as the first WLAN radio chain 222A (e.g., RF chain 1 for 2.4 GHz band processing), the second WLAN radio chain 222B (e.g., RF chain 2 for 5 GHz band processing), and the third WLAN radio chain 222C (e.g., RF chain 3 for 6 or 7 GHz band processing). Each chain may comprise dedicated components (LNA, mixers, filters) optimized for its specific frequency band, enabling simultaneous multi-band operation.

The RF switch circuit 246 may refer to a radio frequency switch circuit configured to route signals between multiple antenna elements with a switching time of less than 100 microseconds and a frequency step size of 100 kHz. The RF switch circuit 246 may enable rapid transitions between frequency bands for continuous spectrum monitoring. In an implementation, the RF switch circuit 246 may be configured to perform dynamic beam steering by switching between different phased antenna arrays installed at different positions around the wireless communication device 104A to route RF signals along different directions as required. This enables adaptable signal propagation, responding to changing network conditions and optimizing communication paths for improved reliability and performance.

In operation, in accordance with an embodiment, the processor 230 may be configured to perform a hardware layer initialization to configure the wireless communication device 104A for spectrum reception and analysis. The hardware layer initialization may be implemented as a sequence of configuration steps executed by the processor 230 immediately after device power-up. In an example, the processor 230 may access configuration registers in the MIMO antenna array 204 to activate the plurality of dual-polarized antennas 206 and configure their reception parameters for both vertical and horizontal polarization modes. The processor 230 may then initialize the RF front-end 208 by setting power levels for the LNA 210 to configure the plurality of different filters 212 with initial bandpass characteristics and further configure the LO 214 to generate specific frequencies for the mixer 216. The processor 230 may also initialize the ADC array 226 by setting initial sampling rates, bit depths, and timing parameters for digitizing the received RF signals. This hardware initialization may establish a baseline operational state for different physical (i.e., hardware) components before enabling any signal processing or any hardware interrupt generation functionality. An exemplary implementation of the hardware layer initialization is explained in detail, for example, in FIG. 4A.

In accordance with an embodiment, the processor 230 may be further configured to perform a firmware layer initialization to load the RTOS 236 and hardware drivers (e.g., the custom hardware drivers 304A) for spectrum monitoring. The firmware layer initialization may begin after the hardware layer initialization is completed. For example, for the firmware layer initialization, the processor 230 may load the RTOS 236 into memory 232, which may establish the kernel, task scheduler, and memory management sub-systems. The RTOS 236 may be configured with pre-emptive priority-based scheduling that may support parallel processing architecture for concurrent spectrum data acquisition and analysis. Second, the processor 230 may initialize the hardware drivers, which may serve as software interfaces between the RTOS 236 and the physical hardware components. The hardware drivers may be used to control the RF front-end 208, interface with the MIMO antenna array 204, and manage the ADC array 226. The hardware drivers may implement hardware abstraction layers that may translate commands into register operations. Third, the processor 230 may setup direct memory access (DMA) channels by configuration of channel priorities, buffer addresses, transfer sizes, and triggering conditions. The DMA channels may be dedicated data pathways that may enable the transfer of spectrum data from the RF front-end 208 to the memory 232 without processor 230 intervention. The processor 230 may configure multiple DMA channels during firmware initialization to support different aspects of spectrum monitoring. For example, a primary DMA channel may be configured specifically for transferring digitized signal samples from the ADC array 226 to the circular buffers 234 in memory. The primary DMA channel may be programmed with source address registers pointing to the ADC output buffers and destination address registers pointing to the current segment of the circular buffer. The DMA controller may be configured with transfer size parameters that may specify how many bytes are transferred in each operation (typically 4 KB to 64 KB per transfer). The DMA channels may be configured in circular mode, where the controller may automatically wrap to the beginning address when reaching the end of a defined memory region. The processor 230 may program the DMA channels with specific interrupt generation conditions, such as buffer-half-full or buffer-complete triggers, that may initiate processing operations at appropriate intervals. Further, additional DMA channels may be configured for transferring processed data between different memory regions or for supporting the wireless communication functions of the wireless communication device 104A. The DMA configuration may include priority settings that may determine which transfers take precedence when multiple channels request access simultaneously, with spectrum monitoring channels typically assigned higher priority to prevent data loss. Fourth, the processor 230 may configure hardware signal interrupts by establishing interrupt vectors, priority levels, and handler routines. This may include configuring the interrupt controller to route hardware interrupt signals from the RF front-end 208 to the appropriate interrupt service routines and establishing the priority hierarchy of system interrupt signals (i.e., hardware interrupt signals). An exemplary implementation of the firmware layer initialization is explained in detail, for example, in FIG. 4A.

In accordance with an embodiment, the one or more antenna arrays 202 may be configured to receive radio frequency (RF) signals across a plurality of frequency bands. The one or more antenna arrays 202 may comprise one or more MIMO antenna arrays, such as the MIMO antenna array 204, having the plurality of dual-polarized antennas 206 configured to receive the RF signals in vertical and horizontal polarizations across the plurality of frequency bands that ranges from direct current (DC) to 300 gigahertz (GHz). In an example, the MIMO antenna array 204 may be a 4×4 MIMO array with specific spacing (e.g., 0.5*k*) at the highest operating frequency) to optimize spatial diversity. In an implementation, the MIMO antenna array 204 may be an antenna array system that may include one or more wide array antennas and may provide a 360° coverage pattern. In an implementation, the MIMO antenna array 204 may include four independent antenna elements with different phases (0°, 90°, 180°, 270°). The MIMO antenna array 204 may be configured to receive multiple independent data streams concurrently on different antennas, effectively increasing capacity without requiring more bandwidth and when receiving the same signal from different antennas, may provide diversity gain to combat fading and improve signal reliability. Further, the plurality of dual-polarized antennas 206 are configured to enhance signal reception and improve spectral efficiency by capturing RF signals in both vertical and horizontal polarizations across multiple frequency bands. For example, each antenna element within the MIMO antenna array 204 may be equipped with orthogonally oriented dipoles or patch radiators that are capable of concurrently receiving RF signals in both vertical and horizontal polarization planes. In this case, since each antenna element may support two independent polarization modes (vertical and horizontal), the combination of MIMO with dual polarization effectively doubles the data communication capacity without increasing bandwidth or frequency usage. Further, as the plurality of dual-polarized antennas 206 allows two independent communication channels per antenna, the need for additional physical antennas is reduced, which may be useful for space-limited applications for compact antenna design and contribute to portability of the wireless communication device 104A. The combination of the MIMO feature with the dual-polarized antennas allows the wireless communication device 104A to capture signals from multiple spatial points and enhances detection accuracy with full polarization coverage for all types of transmissions. This helps detect hidden, weak, or non-line-of-sight (NLOS) signals, which is useful in crowded RF environments.

In accordance with an embodiment, the plurality of frequency bands captured by the MIMO antenna array 204 may range from DC to 100 gigahertz (GHz). In other words, the wireless communication device 104A may perform real-time, wide-band spectrum monitoring across frequencies ranging from DC to 100 GHz with high resolution (for example, down to about 19 kHz). In accordance with an embodiment, the plurality of frequency bands captured by the MIMO antenna array 204 may range from direct current (DC) to 300 gigahertz (GHz). The wireless communication device 104A may be a multi-function device for RF spectrum monitoring and analysis as well as wireless data communication to one or more other wireless communication devices 104B, 104C, . . . , 104N in the wireless mesh network 106. In other words, each network node functions as both a spectrum analyzer and a high-speed communication endpoint.

In accordance with an embodiment, the processor 230 may be further configured to perform an operational layer initialization to start signal processing of the received RF signals and signal classification operation. During the operational layer initialization, the processor 230 may load and initialize the signal processing operations (or algorithms) for spectrum analysis. The signal processing operations may include loading pre-compiled FFT implementations optimized for the processor's architecture, initializing correlation operation with appropriate window sizes and overlap factors, and setting up feature extraction parameters. The processor 230 may load the pattern recognition database 240 into the memory 232 for rapid access during classification operations. The pattern recognition database 240 may include characteristic signatures of known signal types. The processor 230 may also initialize the ANN model 238 by loading pre-trained neural network weights and activation functions. The operational initialization may establish initial threshold values for signal detection, configure patterns matching sensitivity levels, and set default classification parameters that may be later dynamically adjusted during operation. The processor 230 may initialize the circular buffers 234 with appropriate memory allocations and pointer configurations to support continuous spectrum data capture. An exemplary implementation of the operational layer initialization is explained in detail, for example, in FIG. 4A.

In accordance with an embodiment, the processor 230 may be further configured to adjust a plurality of operational parameters of the RF front-end 208 of the wireless communication device 104A to process the received RF signals to obtain digitized down-converted signals that comprise spectrum data. The plurality of operational parameters of the RF front-end 208 may comprise a set of configurable parameters or settings that may determine how the RF front-end 208 processes the received RF signals. In an example, the plurality of operational parameters of the RF front-end 208 comprise two or more analog-to-digital converter sampling rates to digitize the received RF signals, filter configurations of the plurality of different filters 212 in the RF front-end 208, a frequency range selection parameter selected to monitor the plurality of frequency bands by the RF front-end 208 or signal power threshold values configured to trigger one or more spectrum monitoring events. In other words or additionally, the plurality of operational parameters may further include two or more of: gain settings for LNA 210 that may control signal amplification levels; center frequencies and bandwidth configurations for the plurality of different filters 212 that may determine which frequency ranges pass through to subsequent stages; frequency settings for the LO 214 that may establish mixing frequencies for down-conversion operations; injection mode selections (high-side or low-side) for the mixer 216 that may affect image frequency handling; sampling rate, bit depth, and timing configurations for the ADC array 226 that may define digitization characteristics; power levels for various RF stages that may optimize performance while managing power consumption; and impedance matching network settings that may maximize power transfer between RF stages. Each of the plurality of operational parameters may influence the quality, accuracy, and frequency range of the spectrum monitoring capabilities, and the processor 230 may adjust such operational parameters individually or as coordinated groups to optimize reception for specific monitoring objectives.

In an example, for the LNA 210 gain adjustment, the processor 230 may write specific values to digital control registers via a Serial Peripheral Interface (SPI) interface. The digital control registers may be located within various integrated circuits (ICs) that comprise the RF front-end 208. The SPI may refer to a synchronous serial communication protocol that the processor 230 may use to communicate with these RF components. For example, the processor 230 may write value 0×07 to gain control register at address 0×2040 to set maximum gain (30 dB) when monitoring weak signals in the 6 GHz band, or value 0×02 for reduced gain (10 dB) when strong signals are present to prevent saturation. For filter configuration of the plurality of different filters 212, the processor 230 may select specific filter paths by writing to band select registers. For example, when monitoring the 2.4 GHz ISM band, the processor 230 may write value 0×01 to register 0×2050 to activate the appropriate bandpass filter. The processor 230 may then adjust filter bandwidth by writing to the bandwidth control register at address 0×2052-value 0×03 may configure a 100 MHz bandwidth for wideband scanning, while value 0×01 may narrow the bandwidth to 20 MHz for detailed analysis of a specific channel. For LO 214 adjustment, the processor 230 may program the frequency synthesizer through multiple registers. For example, to monitor the 5 GHz band, the processor 230 may write to the PLL integer divider register (address 0×2060, value 0×45) and fractional divider register (address 0×2064, value 0×400000) to generate a 5.5 GHz LO frequency for down-conversion. To switch monitoring to the 3.5 GHz band, the processor 230 may update these registers with values 0×32 and 0×800000, respectively. For the mixer 216 configuration, the processor 230 may select between high-side and low-side injection by writing to the mixer control register at address 0×2070. For ADC array 226 configuration, the processor 230 may adjust sampling parameters by writing to multiple control registers. For wideband monitoring, the processor 230 may write value 0×0A to clock divider register 0×3010 to set a 640MSPS sampling rate, while value 0×20 may configure a slower 160MSPS rate for narrowband high-resolution monitoring. The processor 230 may also adjust bit depth by writing to the ADC configuration register. The processor 230 may coordinate the plurality of operations parameters adjustments based on monitoring objectives and signal classification results. For example, upon detecting a frequency-hopping signal, the processor 230 may reconfigure all parameters in a coordinated sequence: first adjusting the LNA gain to optimize signal levels, then reconfiguring filters to focus on the detected frequency range, adjusting the LO 214 to center the signal in the passband, and finally optimizing ADC parameters for the specific signal characteristics. These dynamic adjustments may transform standard wireless hardware into an adaptive spectrum monitoring platform capable of optimizing its reception characteristics for different signal types as they are detected.

In accordance with an embodiment, the plurality of different filters 212 may be further configured to apply band-specific filtering operation to the received RF signals to isolate signals-of-interest. In accordance with an embodiment, the RF front-end 208 coupled to the MIMO antenna array 204, may be configured to apply band-specific filtering operation to the received RF signals to isolate signals-of-interest. The RF front-end 208 further may comprise the plurality of different filters 212 for the band-specific filtering operation of the received RF signals for the isolation of the signals-of-interest along with at least 50-80 decibels (dB) of spurious signal suppression. In an implementation, the LNA 210 may be placed before pre-filtering stage, as spectrum monitoring may often involve detecting weak or distant signals (e.g., covert transmissions, military radar, low-power IoT devices). Further, to sniff RF signals from the airwave, especially the broad frequency range (e.g., DC-100 GHz), the LNA 210 first approach ensures that signals across all frequencies are captured with minimal loss before band-specific filtering operation. The LNA 210 may amplify such weak signals before they encounter any filtering losses, improving detection accuracy. In some implementations, the LNA 210 may not be placed before the plurality of different filters 212 to reduce out-of-band interference. The wireless communication device 104A may opt for both options of LNA 210 first or without LNA 210 alternatively to see if there is any difference in spectrum monitoring results for enhanced analysis.

In an example, the plurality of different filters 212 may be pre-filters that may process signals across distinct frequency ranges, where low band filtering may operate from 50 MHz to 1 GHz to eliminate interference from TV, FM, and LTE signals, mid band filtering may operate from 1 GHz to 3 GHz to suppress cellular and adjacent Wi-Fi® bands, and high band filtering may operate from 3 GHz to 100 GHz and above to isolate high-frequency signals from 5G, radar, and millimeter-wave sources. In an implementation, the RF front-end 208 may employ a multi-stage filtering architecture that may include cavity filters providing high-Q resonance, Surface Acoustic Wave (SAW) filters, and Bulk Acoustic Wave (BAW) filters for precise frequency selectivity. In some implementation, the wireless communication device 104A may implement an adaptive digital filtering operation using DSP-based notch filters after the analog filtering stage, which may enhance the overall spurious signal rejection capabilities. Further, the implementation of narrowband bandpass filters may enable selective passing of signals-of-interest while maintaining substantial attenuation of unwanted RF signals, wherein the multi-stage spurious suppression operations may achieve 50-80 dB of rejection. This comprehensive filtering operation may be particularly advantageous in dense RF environments where multiple interfering signals may be present, enabling the system to effectively isolate and monitor specific frequency bands of interest while maintaining high signal quality through robust interference suppression.

In accordance with an embodiment, the LO 214 and the mixer 216 may be configured to convert the signals-of-interest to predefined intermediate frequencies that correspond to the digitized down-converted signals. In accordance with an embodiment, the RF front-end 208 may be further configured to down-convert and digitize the isolated signals-of-interest to predefined intermediate frequencies to obtain digitized down-converted signals. In an implementation, the RF front-end 208 may employ the mixer 216 and the LO 214 configuration, where the mixer 216 may combine the filtered RF signals with the LO-generated stable frequency to produce sum and difference frequencies. The difference frequency (RF-LO frequency) may be selected as the desired intermediate frequency (IF), such as 5 GHz, 6 GHz, or 7 GHz while the sum frequency may be discarded. For high-side injection, the LO 214 may be programmed to generate frequencies above 9.8 GHz, pushing image products into frequency ranges where they experience natural attenuation In this case, the IF selection may be predetermined ensuring compatibility with subsequent digitization hardware (e.g., the IEEE 802.11 be chipset, such as the WLAN radio 244 and the WLAN modem 228). The down-conversion to predefined intermediate frequencies allows the wireless communication device 104A to leverage, for example, the IEEE 802.11 be chipset's processing architectures, reducing hardware complexity, while re-purposing for enhanced spectrum monitoring as well as wireless data communication. The down-converted IF signals may then be processed through an Analog-to-Digital Converter (ADC) that may sample and convert the analog IF signals into digital form. Further, the selection of predefined intermediate frequencies may be specifically configured to avoid interference from other signals while matching ADC bandwidth and resolution requirements. This down-conversion and digitization operation may enable advanced digital signal processing capabilities, including real-time filtering, demodulation, and pattern recognition, which may be particularly beneficial for spectrum monitoring applications requiring signal classification, anomaly detection, and cognitive RF adaptation for interference mitigation.

In accordance with an embodiment, the RF front-end 208 may be further configured to perform an RF mapping of the received RF signals in the plurality of frequency bands to one of the predefined intermediate frequencies corresponding to a first intermediate frequency band or a second intermediate frequency band. The first intermediate frequency band may be different from the second intermediate frequency band. Each of the predefined intermediate frequencies corresponding to the first intermediate frequency band and the second intermediate frequency band is one of: 2.4 GHz, 5 GHz, 6 GHz, 7 GHz, or other unlicensed or Industrial, scientific, and medical (ISM) frequency band. The RF band mapper 220 may be configured to demultiplex the obtained digitized down-converted signals in the predetermined intermediate frequencies (e.g., a common intermediate frequency or one or more predetermined intermediate frequencies) into different WLAN frequency bands (e.g., 2.4 GHz, 5 GHz, and 6 GHz) and may assign dedicated paths for efficient processing. The frequency mapping may ensure that the signals are optimally allocated and processed based on resource availability. Based on the resource status, the best IF band assignment out of the different WLAN frequency bands may be done. Once the RF mapping is complete, the digitized down-converted signals signal may then be processed.

In an example, the RF mapping may incorporate channel and spatial mapping capabilities, wherein each frequency band may be divided into distinct channels and spatial mapping may be performed to optimize beamforming and interference management. The wireless communication device 104A may implement a resource allocation mechanism that may dynamically check available resources and perform load balancing across the 2.4/5/6 GHz bands based on congestion levels. Further, the RF front-end 208 may assign dedicated processing paths to the different WLAN frequency bands, where the signals may undergo specific filtering, mixing, and digitization processes based on predefined IF mapping configurations. In other words, the RF front-end 208 may assign to the WLAN radio 244 (e.g., an IEEE 802.11be radio) comprising distinct RF chains for concurrent operations across different frequency bands, such as the first WLAN radio chain 222A (e.g., RF chain 1 for 2.4 GHz band processing), the second WLAN radio chain 222B (e.g., RF chain 2 for 5 GHz band processing), and the third WLAN radio chain 222C (e.g., RF chain 3 for 6 GHz band processing). Each chain may comprise dedicated components (LNA, mixers, filters) optimized for its specific frequency band, enabling simultaneous multi-band operation. This comprehensive RF mapping operation may enable efficient spectrum utilization and optimal signal processing, particularly beneficial for next operation of implementing Multi-Link Operation (MLO) that may require dynamic frequency assignment across multiple bands while maintaining minimal interference and maximum processing efficiency.

In accordance with an embodiment, the processor 230 may be further configured to configure the RF front-end 208 to generate a hardware interrupt signal when a defined spectrum monitoring event is detected. The defined spectrum monitoring event may comprise at least one of: detection of signal power of the received RF signals above a threshold level, detection of signal power within a specified frequency range of the received RF signals, a buffer fill level of the circular buffers that may exceed a predetermined threshold, or a completion state of a spectrum scanning cycle by the RF front-end. The hardware interrupt signal may refer to an electrical signal transmitted from the RF front-end 208 to the processor 230 over a dedicated interrupt request line (IRQ) on the circuit board of the RF front-end 208. The hardware interrupt signal may manifest as a voltage transition (high-to-low or low-to-high) on a physical pin connection between the RF front-end circuitry and the processor's interrupt controller. The hardware interrupt signal may serve as an asynchronous notification mechanism that may immediately alert the processor 230 to the occurrence of predefined spectrum monitoring events without requiring the processor 230 to continuously poll status registers, thereby conserving processing resources.

In accordance with an embodiment, the processor 230 may be further configured to configure the RF front-end 208 to generate the hardware interrupt signal by writing specific values to interrupt control registers within the RF front-end 208 components. For example, the processor 230 may write to the interrupt enable register (address 0×2080) to activate specific interrupt sources, for example, setting bit "0" may enable power threshold interrupts, bit "1" may enable frequency-specific interrupts, bit "2" may enable buffer threshold interrupts, and bit "3" may enable scan completion interrupts. For power threshold event configuration, the processor 230 may write a specific power threshold value (e.g. −65 dBm) to the threshold register, for example, at address 0×2084. When the RF front-end 208 detects signal power that may exceed the specific power threshold value, it may assert the interrupt line, causing the processor 230 to immediately begin spectrum data processing. This type of hardware interrupt signal may be particularly valuable for detecting sudden signal appearances that may require immediate analysis, such as potential security threats or emergency transmissions. For frequency-specific event configuration, the processor 230 may program the frequency monitoring register, for example, at address 0×2088 with specific frequency values of interest (e.g., 2450 MHz for monitoring potential Bluetooth or Wi-Fi® activity). The processor 230 may also set a frequency-specific power threshold, for example, in register 0×208C. When signal power at the specified frequency exceeds this threshold, the RF front-end 208 may generate the hardware interrupt signal. This capability may enable efficient monitoring of specific frequency bands of interest without requiring continuous processing of the entire spectrum. For buffer fill level event configuration, the processor 230 may write a threshold value to another register, for example, to register 0×2090 that may specify what percentage of buffer capacity (typically 75%) should trigger an interrupt (i.e., the hardware interrupt signal). When the ADC array 226 may fill the DMA buffer to this level (e.g., 75%), the RF front-end 208 may generate a specific hardware interrupt signal to notify the processor 230 that sufficient data has accumulated for processing. This approach may optimize memory utilization by ensuring processing begins neither too early (with insufficient data) nor too late (risking buffer overflow). For scan completion event configuration, the processor 230 may set start and stop frequencies for a spectrum scan into registers, for example, 0×2094 and 0×2098, along with step size and dwell time parameters. When the RF front-end 208 completes a full scan cycle across this frequency range, it may generate the hardware interrupt signal. This may enable efficient processing of broadband scanning operations where analysis should occur only after acquiring data across the entire frequency range of interest. The frequency range may refer to the specific start and stop frequencies programmed by the processor 230 into the scan control registers, which may span anywhere within the device's operational range from DC to 300 GHz. For example, the processor 230 may configure scans across various portions of this extensive spectrum: a low-frequency scan from 10 kHz to 30 MHz for monitoring shortwave communications, a mid-range scan from 400 MHz to 6 GHz for conventional wireless communications, a microwave scan from 10 GHz to 30 GHz for satellite and radar systems, or a millimeter-wave scan from 60 GHz to 90 GHz for advanced sensing and communication systems. For extremely high frequencies, the RF front-end 208 may employ the frequency shifting architecture to down-convert signals from frequency ranges as high as 200 GHz to 300 GHz to intermediate frequencies that can be processed by the wireless communication device 104A. The RF front-end 208 may systematically step through these configured frequency ranges using programmable step sizes and dwell times appropriate for each band, and upon completing the entire programmed scan cycle, may generate the hardware interrupt signal to initiate processing of the collected spectrum data. These hardware interrupt mechanisms may collectively enable an event-driven processing architecture that may optimize system resources by activating processing only when specific conditions of interest occur.

Standard Wi-Fi® 7 implementations are typically designed with a specific purpose, i.e., wireless communication. The hardware registers and functions are typically only accessible through limited application programming interface (APIs) provided by manufacturers, which focus on communication functions rather than spectrum analysis.

In contrast to the standard Wi-Fi® 7 implementation or conventional spectrum analyzers, in the present disclosure, the processor 230 may implement direct register access to modify the behavior of the RF front-end 208. The direct register access may refer to a hardware interfacing operation or process that may enable the processor 230 to write configuration values directly to physical memory-mapped hardware registers in the RF components of the RF front-end 208 without utilizing standard software abstraction layers or manufacturer-provided APIs. The hardware interfacing operation or process may allow manipulation of hardware functionality beyond the intended design parameters by modifying internal control registers that may not be documented or exposed through conventional programming interfaces. The processor 230 may write to specific interrupt control registers within the RF front-end 208 components (for example, shown in FIG. 2) including hardware registers within the WLAN RF chains 222A, 222B, and 222C that may not be exposed through standard APIs. By reprogramming these hardware registers, the processor 230 may reconfigure interrupt generation logic to trigger on spectrum monitoring events rather than only packet reception events. This specialized configuration may enable the wireless communication device 104A to respond immediately to RF environment changes without requiring continuous polling of status registers, significantly reducing computational overhead while improving detection responsiveness. The ability to receive hardware interrupts (or hardware interrupt signal) based on spectrum events rather than only communication events may represent a significant advantage and transformation of the wireless hardware's purpose, enabling efficient event-driven spectrum monitoring that may operate concurrently with standard communication functions.

In accordance with an embodiment, the processor 230 may execute custom driver implementations (such as custom hardware drivers 304A of FIG. 3) that may bypass standard Application Programming Interfaces (APIs) to directly access physical hardware registers within the RF front-end 208 components, including the LNA 210, the plurality of different filters 212, the LO 214, the mixer 216, the IF stage 218, and the RF band mapper 220. The processor 230 may identify and manipulate undocumented registers within the WLAN RF chains 222A, 222B, and 222C that may control RF front-end behaviors by systematically scanning register address spaces and analyzing hardware responses. The processor 230 may implement direct register access that may safely modify hardware configuration values without disrupting core wireless communication functionality of the WLAN modem 228, thereby maintaining dual-purpose operation of the wireless communication device 104A. These specialized hardware access may enable the processor 230 to repurpose the wireless communication hardware designed for packet processing into an advanced spectrum monitoring system capable of continuous signal acquisition through the circular buffers 234, real-time analysis using the pattern recognition database 240, and dynamic reconfiguration based on detected signal characteristics.

In accordance with an embodiment, the processor 230 may be further configured to save the processor registers and a process execution state upon receipt of the hardware interrupt signal. When the hardware interrupt signal is received from the RF front-end 208, the processor 230 may immediately suspend its current execution and may begin an interrupt service operation. The interrupt service operation may include preserving the current state of the processor 230 to enable later resumption of the interrupted process. The processor 230 may save the processor registers (e.g., 16-32 registers depending on the processor architecture) by pushing their contents onto a dedicated stack area in the memory 232. The processor registers may include useful computational values, address pointers, and temporary variables from the currently executing process. The processor 230 may also save special-purpose registers such as the program counter that may track the current execution address, status flags that may indicate computational conditions, and stack pointers that may maintain execution context. By saving the complete execution state, the processor 230 may later restore exactly the same state and resume the interrupted process as if no interruption had occurred. This capability may directly enable the wireless communication device 104A to perform spectrum monitoring as a background function without disrupting primary communication tasks or other processes executing on the wireless communication device 104A. In another example, the processor 230 may save any task-specific context information maintained by the RTOS 236, including task identifiers, priority levels, and timing information. This saved state may be stored in a predefined region of the memory 232 specifically allocated for context storage, with separate regions maintained for different types of interrupts to enable nested interrupt handling.

In accordance with an embodiment, based on the hardware interrupt signal, the processor 230 may be further configured to initiate a first processing path configured to transfer the spectrum data to the memory via a direct memory access (DMA) operation and manage the circular buffers in the memory for the spectrum data. The DMA operation may refer to a hardware-based data transfer operation that may move spectrum data from the RF front-end 208 to the memory 232 without requiring processor 230 intervention. This specialized operation may enable high-speed, efficient data transfers in parallel with other processing tasks, allowing continuous data acquisition while minimizing processor overhead. Based on the hardware interrupt signal, the processor 230 may initialize the first processing path by configuring the DMA controller with source and destination addresses for transferring spectrum data. The DMA controller may be a hardware component that autonomously manages direct data transfers between the memory 232 and peripheral devices, such as the ADC array 226, without processor intervention, enabling efficient, high-speed data movement across the different components of the wireless communication device 104A. The DMA source address may be set to the output buffers of the ADC array 226, while the destination address may point to the next available segment in the circular buffers 234 within the memory 232. The DMA source address may be a specific memory location or hardware register address from which the DMA controller initiates data transfer. The processor 230 may configure the DMA transfer size based on the bandwidth being monitored, for example, ranging from 4 KB to 100 MB per transfer. The processor 230 may program the DMA controller to operate in circular buffer mode where it automatically wraps around to the beginning of the buffer region when reaching the end address. In such an embodiment, the circular buffer mode may enable continuous data streaming by seamlessly transitioning from the terminal address of the memory buffer to its initial address without requiring direct processor intervention. The DMA controller may maintain a persistent data transfer by treating the circular buffers 234 as a continuous, looping storage region. For continuous streaming, the processor 230 may implement a double-buffering scheme where the DMA fills one buffer segment while processing occurs on another segment. For example, when implementing a four-segment circular buffer design, the processor 230 may create a buffer descriptor table in the memory 232, for example, at address 0×40000, including four descriptor entries of 16 bytes each. Each descriptor may include current address pointer (4 bytes), buffer length (4 bytes), status flags (2 bytes), control flags (2 bytes), and link to next descriptor (4 bytes). The processor 230 may set the first descriptor with a destination address pointing to buffer segment, for example, at 0×50000, length of certain bytes, such as 16384 bytes, status flag 0×01 (ready), control flags 0×03 (generate interrupt when full, auto-reload), and link pointer to the second descriptor. When the first buffer segment fills, the DMA controller may automatically switch to the second buffer segment while generating an interrupt to signal that the first segment is ready for processing. The processor 230 may implement a state machine that tracks each buffer segment through states including "EMPTY" (0×00), "FILLING" (OxOl), "FULL" (0×02), "PROCESSING" (0×03), and "PROCESSED" (0×04), with atomic state transitions controlled by interrupt handlers. In other words, the processor 230 may maintain buffer descriptor tables in the memory 232 that track the status of each buffer segment (empty, filling, filled, processing, or processed) and update these descriptors through memory mapped I/O operations. The processor 230 may implement buffer overflow protection by monitoring DMA progress and adjusting transfer parameters if processing falls behind data acquisition.

Beneficially, by initiating the first processing path configured to transfer the spectrum data via the DMA operation and manage circular buffers 234, the processor 230 may achieve continuous, uninterrupted data acquisition that traditional processing architectures may not support. This approach may transform Wi-Fi® hardware originally designed for burst packet transfers into a continuous spectrum monitoring platform. The DMA-driven first path may operate autonomously, freeing the processor 230 from direct memory management while eliminating data transfer bottlenecks that would otherwise limit monitoring capabilities.

In accordance with an embodiment, based on the hardware interrupt signal, the processor 230 may be further configured to concurrently initiate a second processing path configured to perform signal analysis on the spectrum data and extract spectral features. When the first processing path manages the spectrum data transfer, the processor 230 may concurrently initiate the second processing path by allocating distinct processing resources (such as separate cores in a multi-core processor or dedicated DSP units) for signal analysis tasks. The signal analysis may be performed on the digitized spectrum data through multiple processing operations. First, the processor 230 may execute Fast Fourier Transform (FFT) operations to convert the time-domain samples into frequency-domain representations. The processor 230 may implement different FFT sizes (1024, 2048, or 4096 points) depending on the required frequency resolution, with larger FFT sizes providing finer resolution but requiring more computational resources. Prior to the FFT computation, the processor 230 may apply windowing functions to the input data to reduce spectral leakage, with different windows (Hanning, Blackman-Harris, or Kaiser) selected based on the signal characteristics being analyzed. The processor 230 may be configured to extract the spectral features based on the signal processing and analysis, for example, using the FFT operations. The spectral features extracted by the processor 230 may comprise specific measurable characteristics that may identify and classify different signal types.

In accordance with an embodiment, the extracted spectral features may include two or more of frequency domain features (e.g., center frequency, bandwidth, channel spacing, frequency deviation, and spectral shape metrics), power features (e.g., peak power, average power, power spectral density, and signal-to-noise ratio), modulation features (e.g., modulation type indicators, symbol rate, constellation characteristics, and frequency/phase stability metrics), temporal features (e.g., pulse repetition intervals, duty cycles, burst durations, and timing patterns), or statistical features (e.g., spectral kurtosis or amplitude probability distribution). The frequency domain features may provide information about where signals exist in the frequency spectrum and how they occupy bandwidth. The power features may characterize the signal's energy distribution and strength relative to noise. The modulation features may reveal how information is encoded onto carrier signals. The temporal features may characterize how signals vary over time, which may be used to identify pulsed or intermittent transmissions. The statistical features may capture higher-order statistical properties that may differentiate complex signal types. Together, such features may enable the wireless communication device 104A to generate a comprehensive signature of each detected signal for accurate classification and characterization across diverse signal types.

In accordance with an embodiment, for frequency domain feature extraction, the processor 230 may be configured to perform peak detection on the FFT output using adaptive thresholding, followed by bandwidth measurement at specified power levels (e.g., 3 dB, 10 dB, and 20 dB below peak). For modulation recognition, the processor 230 may analyze phase and amplitude variations over time, comparing them against known modulation patterns. For temporal feature extraction, the processor 230 may use edge detection on the signal envelope to identify pulse boundaries and timing relationships.

In accordance with an embodiment, the processor 230 may implement specialized digital signal processing operations to extract additional spectral features that may enable more precise signal classification. For spectral shape characterization, the processor 230 may calculate the power spectral density (PSD) of the signal using methods such as Welch's periodogram with different segment sizes and overlap factors depending on the signal duration. The processor 230 may quantify spectral shape using metrics such as spectral flatness measure (SFM), which may calculate the ratio of geometric mean to arithmetic mean of the PSD to distinguish between narrowband and broadband signals. The processor 230 may also compute spectral entropy, which may measure the randomness of the frequency distribution to differentiate between structured signals and noise-like signals. For signals with complex modulation schemes, the processor 230 may implement cyclostationary feature detection, which may identify hidden periodicities in the signal that are not apparent in conventional spectral analysis. This may involve computing the spectral correlation function (SCF) across different cycle frequencies, which may reveal distinctive patterns for specific modulation types such as OFDM, QAM, or FSK. The processor 230 may also perform time-frequency analysis using techniques such as the Short-Time Fourier Transform (STFT) or Wigner-Ville distribution to characterize signals with time-varying spectral content, such as chirp signals or frequency-hopping transmissions.

In accordance with an embodiment, the processor 230 may generate a structured feature vector that may comprise the extracted features. The structured feature vector may include normalized values for each feature type, which may ensure consistent classification regardless of signal strength or specific frequency. The feature vector may be time-stamped and stored with metadata including the buffer segment reference, frequency range, and confidence metrics for each extracted feature. The processor 230 may be further configured to dynamically determine which features provide the most discriminative value for classification based on the current RF environment and signal characteristics. The spectral features extraction process may create rich, multi-dimensional signal representations that may enable accurate classification even for complex or previously unknown signal types.

Beneficially, concurrently initiating the second processing path for signal analysis and feature extraction may enable the wireless communication device 104A to process and analyze spectrum data concurrently with acquisition in the first processing path, a capability not present in conventional systems using Wi-Fi® chipset that must alternate between acquisition and analysis. The concurrent initiation of the second processing path configured to perform signal analysis on the spectrum data and extract spectral features may eliminate the traditional tradeoff between continuous monitoring coverage and thorough signal analysis that plagues conventional spectrum monitoring systems.

In accordance with an embodiment, the processor 230 may be further configured to perform, using the plurality of buffer segments 234A, sequential rotation for continuous capture of the spectrum data without interruption. The circular buffers 234 may include the plurality of buffer segments 234A that may be arranged in a circular fashion, with each segment being a contiguous block of memory. The processor 230 may write an incoming spectrum data to one buffer segment while the signal processing operation may read from another buffer segment. The processor 230 may maintain head and tail pointers to track which segments are currently being written to and read from. When the DMA controller completes filling a buffer segment, the processor 230 may update the head pointer to the next available segment and reconfigure the DMA controller to write to this new location without stopping the data capture. Similarly, when signal processing completes on a buffer segment, the processor 230 may update the tail pointer to mark that buffer segment as available for new data. The processor 230 may be further configured to perform buffer management to dynamically adjust the number of active buffer segments based on processing load and data acquisition rates. If processing temporarily falls behind acquisition, additional buffer segments may be allocated in the memory 232 to prevent data loss until processing catches up.

In accordance with an embodiment, the processor 230 may be further configured to synchronize the first processing path and the second processing path to correlate the spectrum data in the circular buffers 234 with the extracted spectral features. The processor 230 may implement a synchronization mechanism using timestamping and buffer management operations. Each buffer segment of the plurality of buffer segments 234A may be tagged with a timestamp value stored in a designated header field indicating when the data was captured. Similarly, each set of extracted features may be tagged with the timestamp value of a corresponding buffer segment from which they were derived. The processor 230 may maintain a synchronization table in the memory 232 that may map the plurality of buffer segments 234A to their corresponding spectral feature sets using these timestamp values. When the spectrum data is correlated with the extracted spectral features, the processor 230 may use these timestamp values to ensure temporal alignment between the original signal data and the analysis results. The processor 230 may implement access control flags in the memory 232 that may prevent conflicting operations where one processing path might attempt to access data that the other processing path is still modifying. For continuous monitoring, the processor 230 may implement a sliding window operation where spectral features from multiple consecutive buffer segments in the plurality of buffer segments 234A may be analyzed together to identify patterns that span segment boundaries. The processor 230 may use memory update operations to ensure that changes to buffer status flags in the memory 232 are immediately visible to both processing paths.

In accordance with an embodiment, the processor 230 may be further configured to assign processing priority levels for the extracted spectral features based on signal characteristics. The processor 230 may implement a multi-factor prioritization specifically designed for spectrum monitoring. For example, for signals with high power levels that exceed predefined thresholds (e.g., 20 dB above the noise floor), the processor 230 may assign priority level 1 (highest) as these may represent nearby transmitters or potential interference sources that may require immediate analysis. For signals detected in specific frequency bands of interest predefined in a priority band table stored in memory 232 (such as emergency service bands or restricted frequency ranges), the processor 230 may assign priority level 2, which may ensure rapid classification of signals in security-sensitive bands. For signals exhibiting frequency-hopping characteristics detected through the cross-band correlation operations, the processor 230 may assign priority level 3, as these may represent sophisticated communication systems requiring prompt characterization. For signals with modulation characteristics matching patterns in the threat database subset of the pattern recognition database 240, the processor 230 may assign priority level 4. The processor 230 may assign lower priority levels (5-8) to common signal types with known benign characteristics. This prioritization may directly support the first and the second processing paths by enabling the processor 230 to allocate computational resources efficiently between the two processing paths, ensuring that potentially useful signals receive immediate analysis while routine signals are processed according to available resources, thereby maximizing the effectiveness of the spectrum monitoring capabilities.

In accordance with an embodiment, the processor 230 may be further configured to execute a signal classification operation on the extracted spectral features based on the assigned processing priority levels. The processor 230 may process the higher priority features before lower priority ones. For each set of spectral features, the processor 230 may normalize the feature values to ensure consistent classification regardless of signal strength or specific frequency. The processor 230 may then identify the most discriminative features for classification based on previously established feature importance ranking. In an implementation, the processor 230 may be further configured to compare the extracted spectral features against characteristic patterns of known signal types in the pattern recognition database 240 in the wireless communication device 104A to classify detected signals. In another implementation, the processor 230 may be further configured to execute the trained ANN model 238 on the extracted spectral features when the extracted spectral features do not belong to any of the characteristic patterns of the known signal types in the pattern recognition database 240.

In accordance with an embodiment, the processor 230 may be further configured to detect frequency hopping patterns between the first intermediate frequency band and the second intermediate frequency band based on the cross-band correlation. The classification of the detected signals is further based on the detected frequency hopping patterns. The processor 230 may detect frequency hopping patterns between the 5 GHz and 6 GHz intermediate frequency bands by leveraging the cross-band correlation analysis through a multi-step process. For example, firstly, a time-synchronized buffer of FFT outputs may be maintained from both bands (using 4 memory blocks for 5 GHz and 8 for 6 GHz), then correlation coefficients may be computed between these bands at different time instants, creating a temporal correlation matrix that reveals signal jumps between frequencies. The processor 230 may be configured to look for characteristic patterns in the temporal correlation matrix where high correlation values (>0.90) appear alternately in different frequency bins across bands, indicating frequency hops. For example, a signal might show strong correlation at 5.2 GHz at time t1, then at 6.1 GHz at time t2, and back to 5.4 GHz at time t3, with consistent time intervals between hops indicating a structured hopping pattern rather than random interference. This pattern detection may be useful for signal classification as it helps distinguish between legitimate frequency-hopping signals (like modern wireless protocols) and sporadic interference or jamming attempts. The classification may consider factors such as hop timing regularity (e.g., consistent 100 ms intervals), frequency selection patterns (e.g., predetermined hop sequences), and correlation strength at hop instances (typically >0.90 for legitimate signals). The processor 230 may utilize this hopping pattern information alongside other parameters like spatial features and signal strength to make a final classification decision, enabling more accurate identification of signal types and potential security threats in the monitored spectrum.

In accordance with an embodiment, the processor 230 may be further configured to perform a real-time or near real-time spectrum energy detection in each of the first intermediate frequency band and the second intermediate frequency band. The processor 230 may perform real-time or near real-time spectrum energy detection across, for example, both the 5 GHz and 6 GHz intermediate frequency bands through a concurrent processing approach where it may continuously compute power spectral density (PSD) estimates using Welch's method with overlapping segments (75% overlap) and Hanning windows on the digitized down-converted signals from each band. The processor 230 may implement this by maintaining separate circular buffers (4 memory blocks for 5 GHz band processing 160 MHz bandwidth, 8 memory blocks for 6 GHz band processing 320 MHz bandwidth) and may perform the sliding window FFT operations (1024-point FFT for 5 GHz, 2048-point FFT for 6 GHz) to generate instantaneous power measurements across the frequency bins. For each band, the energy detection involves calculating the average power within specified frequency bins and comparing it against an adaptive threshold that is dynamically updated based on noise floor estimation. For example, if the measured energy in a particular 20 MHz channel exceeds the adaptive threshold by 10 dB, that channel is marked as active. The processor 230 may maintain a real-time occupancy map for each band, where energy levels, channel utilization, and temporal variations may be tracked to enable a real-time or near real-time detection of spectrum activity changes and potential interference sources while maintaining a typical processing latency under 100 microseconds to ensure true real-time monitoring capability.

In accordance with an embodiment, the processor 230 may be further configured to identify coordinated transmission patterns based on energy correlations using the spectrum energy detection. The processor 230 may be configured to identify coordinated transmission patterns by analyzing energy correlations derived from the real-time spectrum energy detection across, for example, both 5 GHz and 6 GHz intermediate frequency bands. For example, after energy pattern matrices are generated for each band using the power spectral density measurements from the sliding window FFT operations (1024-point FFT for 5 GHz, 2048-point FFT for 6 GHz), temporal cross-correlation between these energy patterns may be determined to detect synchronized activities. The processor 230 may be configured to find specific coordination signatures. For example, when energy bursts appear simultaneously or with fixed time offsets across different frequency channels (like a transmission at 5.2 GHz followed by a correlated burst at 6.1 GHz after a 50 ms delay), it indicates potential coordinated transmission patterns rather than random concurrent transmissions. These patterns may be characterized using metrics such as energy burst timing correlations (typically >0.85 for coordinated transmissions), spectral occupancy similarity across bands (matching bandwidth and duration patterns), and consistent inter-transmission intervals (e.g., synchronized 100 ms periodic transmissions across bands). For instance, if two signals show energy correlation coefficients above 0.90 with consistent 100 ms timing offsets between 5 GHz and 6 GHz bands, the processor 230 may classify such transmission as a coordinated transmission pattern, enabling identification of sophisticated multi-band communication systems and potential interference sources that operate across multiple frequency bands in a coordinated manner. In another implementation, beneficially, when analyzing transmissions between 5 GHz and 6 GHz bands, if two signals show energy bursts with temporal alignment within 1 s (scoring 0.95), spectral occupancy similarity of 85% (scoring 0.85), and phase coherence of 0.90, the processor 230 may be configured to calculate an Energy Pattern Synchronization Index (EPSI) of (0.95*0.4+0.85*0.3+0.90*0.3=0.905), indicating highly coordinated transmission. Such EPSI metric may represent a unique approach to quantifying coordination levels in multi-band transmissions, enabling more accurate identification of sophisticated communication systems that might be employing advanced frequency hopping or band aggregation techniques. The addition of phase coherence to traditional energy correlation methods particularly enhances the system's ability to distinguish between truly coordinated transmissions and coincidental concurrent energy patterns.

In accordance with an embodiment, the processor 230 may be further configured to perform a real-time or near real-time spectrum monitoring based on the processed digitized down-converted signals. The real-time or near real-time spectrum monitoring may enable instant detection and classification of signals while maintaining high accuracy and low latency, suitable for dynamic spectrum environments requiring instant response to emerging signals or interference. The spectrum monitoring process may include enhanced signal analysis. For example, the FFT operation with 4096-point resolution on the processed digitized down-converted signals, the power spectral density calculations with 78.125 kHz resolution bandwidth, and maintenance of continuous processing buffer for real-time updates may achieve processing latency under 1 or 5 microseconds. The spectrum monitoring process may include signal detection and classification (e.g., based on monitored spectral energy variations in 5 GHz and 6 GHz bands concurrently, identification of signal patterns using the trained ANN model 238), detection of frequency hopping or spread spectrum analysis).

In accordance with an embodiment, the processor 230 may be further configured to re-adjust the plurality of operational parameters of the RF front-end 208 based on results from the executed signal classification operation. After the signal classification operation, the processor 230 may implement a feedback loop to optimize the plurality of operational parameters of the RF front-end 208 for improved detection and classification in subsequent operations. For signals of interest that were successfully classified, the processor 230 may narrow filter bandwidths in the plurality of different filters 212 to focus on the specific frequencies where these signals appear, improving signal-to-noise ratio by reducing out-of-band noise. The processor 230 may adjust the gain settings of the LNA 210 to optimize for the signal strength levels detected during classification, ensuring good dynamic range without saturation. If frequency-hopping signals are detected, the processor 230 may reprogram the LO 214 to implement frequency following or may configure hardware-accelerated hopping sequence matching. The processor 230 may adjust ADC sampling parameters, including sampling rate and bit depth, to optimize for the bandwidth and dynamic range requirements of the classified signals. For weak signals of interest, the processor 230 may implement longer integration times by adjusting buffer sizes and DMA transfer configurations. The processor 230 may also adjust detection thresholds based on the ambient noise floor measured during classification to maintain a consistent false alarm rate despite changing RF environments.

In accordance with an embodiment, the processor 230 may be further configured to detect frequency-hopping signals based on correlation of the spectral features across a plurality of time intervals. The processor 230 may be further configured to identify frequency-hopping spread spectrum (FHSS) signals that change transmission frequency according to predetermined or pseudo-random patterns. The processor 230 may maintain a history buffer of spectral features from multiple consecutive time intervals, typically spanning several seconds to minutes depending on expected hopping rates. For each potential signal, the processor 230 may track appearances and disappearances across different frequency channels, searching for temporal patterns that indicate coordinated hopping rather than independent signals. The processor 230 may apply statistical analysis to identify non-random distributions of channel usage that could indicate a hopping pattern. For suspected FHSS signals, the processor 230 may attempt to reconstruct the hopping sequence by measuring time intervals between appearances on different channels. The processor 230 may recognize patterns even when some hops are missed due to interference or fading. Once a potential hopping pattern is identified, the processor 230 may predict future hop frequencies and adjust monitoring parameters to verify the prediction, confirming the detection if the signal appears as predicted. The hopping parameters, including dwell time, hop rate, and frequency set, may be recorded as part of the signal classification.

In accordance with an embodiment, the processor 230 may be further configured to detect a jamming signal and perform a jamming suppression of the detected jamming signal based on the executed signal classification operation and the re-adjusted plurality of operational parameters of the RF front-end 208. The processor 230 may analyze classified signals to identify potential jammers based on characteristics such as unusually high power levels, wideband frequency coverage, or modulation patterns known to be associated with jamming techniques. For constant jammers, the processor 230 may identify signals that maintain high power continuously across wide bandwidths. For sweep jammers, the processor 230 may detect systematic frequency sweeping patterns using time-frequency correlation. For pulse jammers, the processor 230 may identify signals with very high peak-to-average power ratios and distinctive temporal patterns. Once a jammer is detected, the processor 230 may implement suppression techniques by reconfiguring the RF front-end 208. For narrowband jammers, the processor 230 may program the plurality of different filters 212 to implement notch filtering at the jammer frequency. For directional jammers, the processor 230 may configure the MIMO antenna array 204 to perform spatial filtering by adjusting phase relationships between antennas to create nulls in the direction of the jammer. The processor 230 may also implement digital cancellation where jammer characteristics are used to generate an inverse signal that is subtracted from the received signal. For frequency-hopping jammers, the processor 230 may implement predictive blanking where reception is temporarily disabled during predicted jammer transmissions.

In accordance with an embodiment, the processor 230 may be further configured to restore the processor registers and the process execution state after completion of the signal classification operation. After all signal processing and classification operations are complete, the processor 230 may perform context restoration to return to the previously interrupted process. The processor 230 may retrieve the saved register values from the dedicated stack or memory region where they were stored during the initial context switch. The processor 230 may restore all general-purpose registers to their previous values by performing a series of load operations from the saved context area. The processor 230 may restore the program counter register to the instruction address where execution was interrupted, enabling the previous process to continue execution from exactly where it left off. The processor 230 may restore special-purpose registers including status flags, stack pointers, and floating-point or vector registers to their pre-interrupt states. For cached memory systems, the processor 230 may perform cache invalidation or restoration operations to ensure the restored process sees a consistent memory state. The processor 230 may update any RTOS task control blocks to reflect the restored task's state and reschedule it according to its original priority. Lastly, a return-from-interrupt instruction that atomically completes the transition back to the interrupted process, may be executed.

In accordance with an embodiment, the processor 230 may be further configured to execute a real-time operating system (RTOS) to schedule one or more spectrum monitoring tasks, one or more signal processing tasks, and one or more interrupt-signal service tasks based on predefined system task priority levels. The predefined system task priority levels are distinct from the processing priority levels assigned to the extracted spectral features. The processor 230 may run an RTOS specifically configured to perform real-time signal processing with deterministic timing guarantees. The RTOS may implement a priority-based preemptive scheduling where higher priority tasks can interrupt lower priority ones. The processor 230 may assign the highest system priority levels to interrupt service tasks (typically levels 0-3 in a multi-level priority scheme) to ensure immediate response to hardware events. Signal processing tasks that perform time-critical operations such as FFT calculation or feature extraction may be assigned medium-high priority levels (typically 4-7) to ensure they complete within timing constraints. Spectrum monitoring management tasks that handle configuration changes or classification may be assigned medium priority levels (typically 8-12). Background tasks such as database updates or logging may be assigned the lowest priority levels (typically 13-15). The processor 230 may implement priority inheritance protocols to prevent priority inversion problems where high-priority tasks are blocked by lower-priority ones. The RTOS may also provide mechanisms for inter-task communication through message queues, semaphores, and shared memory regions with appropriate synchronization primitives.

In accordance with an embodiment, the processor 230 may be further configured to execute wireless data communication to transmit and receive data packets through the RF front-end 208. In addition to the spectrum monitoring, the processor 230 may implement standard wireless communication protocols to provide data connectivity. The processor 230 may execute protocol stack software implementing standards such as Wi-Fi® 7, Bluetooth, or cellular protocols depending on the communication requirements. For transmit operations, the processor 230 may prepare data packets with appropriate headers, perform protocol-specific encoding, and transfer the encoded data to transmission buffers in the RF front-end 208. For receive operations, the processor 230 may process incoming packets, perform error checking, acknowledgment, and protocol handling according to the relevant standards. The processor 230 may implement security protocols such as WPA3 or other encryption mechanisms to secure the wireless communications. The processor 230 may manage connection states, including authentication, association, and handover procedures required by the wireless protocols. Quality of Service (QoS) mechanisms may be implemented to prioritize different types of traffic according to their latency and bandwidth requirements. The processor 230 may also handle power management aspects of wireless communication, adjusting transmission power and timing to optimize battery life while maintaining connectivity.

In accordance with an embodiment, the processor 230 may be further configured to concurrently or alternatively perform the spectrum monitoring and wireless data packet processing operation for the wireless data communication. The processor 230 may perform resource sharing to support both spectrum monitoring and data communication functions using the same hardware. In time-division multiplexing mode, the processor 230 may alternate between communication and monitoring functions on a scheduled basis, with typical switching intervals ranging from 1 to 100 milliseconds depending on latency requirements. During communication periods, the RF front-end 208 may be configured for standard protocol operation, while during monitoring periods, it may be reconfigured for wideband reception. In frequency-division mode, the processor 230 may allocate different frequency bands for concurrent wireless data communication and spectrum monitoring, using the multi-band capabilities of the RF front-end 208. The processor 230 may implement intelligent scheduling that prioritizes communication during active data transfers while focusing on monitoring during idle periods. The processor 230 may also implement opportunistic monitoring where spectrum analysis is performed on received communication packets in addition to their normal protocol processing, extracting additional environmental information without dedicated monitoring time. For multi-core processors, the processor 230 may assign different cores to handle communication and monitoring tasks independently.

In accordance with an embodiment, the processor 230 may be further configured to maintain distinct circular buffer regions for each operation type of the spectrum monitoring and the wireless data packet processing operation. The memory 232 may be partitioned to maintain separate buffer regions dedicated to different operational needs. For spectrum monitoring, the processor 230 may allocate circular buffer regions optimized for continuous data capture, with buffer sizes typically ranging, for example, from 4 MB to 64 MB depending on the monitoring bandwidth and duration requirements. For wireless data communication, the processor 230 may allocate separate transmit and receive buffer regions structured according to the requirements of the communication protocol. The circular buffers 234 may be organized as linked lists of packet descriptors rather than continuous memory regions. The processor 230 may implement memory protection to prevent operations in one buffer region from corrupting data in another region. Dynamic memory management may allow the processor 230 to adjust the allocation between monitoring and communication buffers based on current operational needs. For systems with hierarchical memory architectures, the processor 230 may place frequently accessed buffer regions in faster memory (such as cache or tightly-coupled memory) while using main memory for larger, less time-critical buffers. The processor 230 may implement different buffer management policies for each region, optimizing for the specific access In accordance with an embodiment, the processor 230 may be further configured to control the wireless communication device 104A to trigger an operational response based on the classified signals and the cross-band correlation. The operational response may comprise at least one of a spectrum sensing and management action, a dynamic spectrum reallocation action to adjust spectrum resources to optimize network performance and reduce interference, or a distribution of spectrum monitoring information across a plurality of other wireless communication device 104As in the wireless mesh network 106. In accordance with an embodiment, the spectrum sensing and management action may be at least one of: selection of a frequency band and a polarization type at the wireless communication device 104A for data communication above a defined data throughput, adjustment of spectrum analysis parameters at the wireless communication device 104A or tracking and characterization of threat signals in a contested spectrum environment.

In an example, when the classified signals are identified as legitimate signal communications, the processor 230 may be further configured to select optimal frequency bands for signal monitoring while maintaining current communication links; may adjust filter parameters of the plurality of different filters 212 and correlation thresholds in the cross-correlation to maintain signal quality based on validated patterns. The processor 230 may optimize spectrum resource allocation to enhance network performance. For example, to optimize band selection, the processor 230 may switch between 2.4/5/6 GHz bands based on interference levels. In another example, in order to optimize band selection, the processor 230 may dynamically select 6 or 7 GHz for 320 MHz bandwidth when higher throughput needed from a current throughput state or may switch back to 5 GHz for 160 MHz bandwidth when appropriate (e.g., throughput need decreased) or fall back to 2.4 GHz band when needed for redundancy. Further, to optimize resolution, the processor 230 may select between 19 kHz, 39 kHz, or 75 kHz subcarrier spacing in an example. In another example, the same data item may be sent via the first intermediate frequency band (5 GHz) the second intermediate frequency band (6 GHz0 to not only improve reliability through redundant processing paths but also provide periodically cross-validation of signal characteristics which in turn enhances detection accuracy through multiple observations and provides better immunity against band-specific interference. Further, other operational responses when the classified signals are legitimate signal communications may include but are not limited to spectrum usage coordinate and legitimate signal information sharing with other wireless communication devices 104B, 104C, . . . , 104N in the wireless mesh network 106, update of the pattern database with confirmed legitimate signal signatures, continuous spectrum monitoring to track signal characteristic changes, operational parameters adaptation based on evolving signal conditions. These actions may collectively ensure reliable handling of legitimate communications while optimizing system awareness and performance.

In another scenario, when the classified signals are potential jamming signals, the processor 230 may be configured to perform the following operational response or actions: may execute null steering through adaptive beamforming to minimize jamming signal reception while maintaining tracking of the moving interference sources; may optimize filter configurations and LO parameters for enhanced jamming rejection; may update detection parameters and correlation thresholds based on identified jamming patterns; may generate alerts when energy patterns match defined jamming threat criteria; may continuously monitor spectral density variations to assess jamming effectiveness; and may adapt bandwidth allocation to maintain optimal network performance in presence of jamming signals. These coordinated actions may enable effective jamming mitigation while maintaining network operation.

In yet another scenario, when the classified signals are identified as frequency hopping transmissions, the processor 230 may dynamically adjust bandwidth and correlation parameters to maintain tracking as frequencies change; may perform cross-band correlation to validate detected frequency hops; may execute adaptive beamforming to maintain signal reception across frequency transitions; may update the pattern recognition database 240 with newly identified hopping sequences; may share hopping pattern information across the wireless mesh network 106 for coordinated monitoring; may generate alerts if hopping patterns match threat criteria; and may adapt spectrum allocation to minimize interference with legitimate communications. These coordinated actions may enable effective tracking and response to frequency hopping signals.

In another scenario, when the classified signals are identified as unknown or anomalous signals tagged for further analysis, the processor 230 may be configured to generate the following operational response (or perform the following actions): may execute enhanced cross-band correlation across both intermediate frequency bands to gather additional signal characteristics; may perform high-resolution spectral analysis by adjusting subcarrier spacing and LO drifting parameters; may compare signal patterns against the pattern recognition database 240 using the trained ANN model 238 for potential matches; may collect and store detailed signal parameters including modulation, timing, and frequency characteristics for further analysis; may distribute anomalous signal information across the wireless mesh network 106 to gather correlated observations; may generate alerts for persistent unknown patterns; may adapt signal detection thresholds for the unknown or anomalous signals to improve sensitivity for similar future signals; and may maintain continuous monitoring of the identified frequency bands where unknown signals were detected. These actions may enable comprehensive characterization and tracking of unknown signal sources.

In accordance with an embodiment, the processor 230 may be further configured to generate threat assessments based on the classified signals. The threat assessments may be based on real-time analysis of classified signals. The threat classification may be jamming detection, protocol violations, such as unauthorized or anomalous network behaviors, behavioral anomalies (e.g., using the ANN model 238 to recognize deviations from expected RF patterns), or signal origin tracking (e.g., locating sources of threats using multi-node triangulation and spatial processing). The processor 230 may be further configured to generate one or more alerts when the correlated energy patterns match a defined threat criteria as the operational response.

Figure 3:
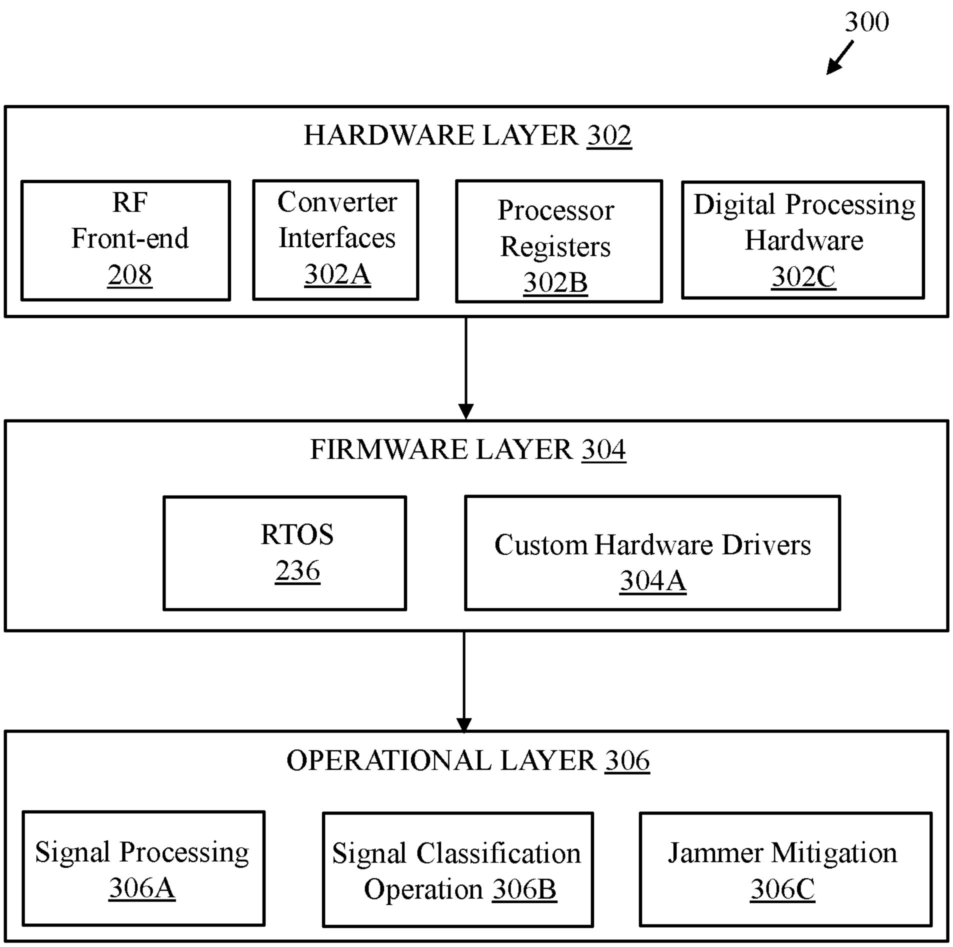
FIG. 3 is a diagram that illustrates an exemplary hardware layer, a firmware layer, and an operational layer in a wireless communication device configured to perform spectrum monitoring, in accordance with an exemplary embodiment of the disclosure.

FIG. 3 is a diagram that illustrates an exemplary hardware layer, a firmware layer, and an operational layer in a wireless communication device configured to perform spectrum monitoring, in accordance with an exemplary embodiment of the disclosure. FIG. 3 is explained in conjunction with elements from the FIGS. 1 and 2. With reference to FIG. 3, there is shown a hardware layer 302, a firmware layer 304, and an operational layer 306 in the wireless communication device 104A configured to perform spectrum monitoring.

The hardware layer 302 may include but is not limited to the RF front-end 208, the converter interfaces 302A (e.g., analog to digital converter (ADC) interface or digital to analog converter (DAC) interface), processor registers 302B, or other digital processing related hardware, hereinafter simply referred to as digital processing hardware 302C. The RF front-end 208 may comprise the physical components that process the received RF signals, including the LNA 210, the plurality of different filters 212, the LO 214, the mixer 216, and the RF band mapper 220 (shown for example, in FIG. 2). The converter interfaces 302A may provide the bridge between analog and digital domains, converting RF signals to digital samples and vice versa. The processor registers 302B may store the current execution state that may be saved during context switching when hardware interrupts occur. The digital processing hardware 302C may include FFT accelerators, DSPs, and other specialized processing elements that may support spectrum analysis operations.

The firmware layer 304 may include but is not limited to the RTOS 236 (i.e., a custom RTOS) and custom hardware drivers 304A. The RTOS 236 may manage task scheduling, interrupt handling, and resource allocation, with priority-based preemptive scheduling that may support the first processing and the second processing path architecture. The custom hardware drivers 304A may implement the direct register access operations that may configure the RF front-end 208 for spectrum monitoring rather than just communication. The custom hardware drivers 304A may provide the low-level interfaces to control DMA operations, configure the circular buffers 234, instruct the hardware interrupt signal generation, and adjustment of RF parameters.

The operational layer 306 may be configured to execute one or more operations that include signal processing 306A, signal classification operation 306B, and/or jammer mitigation 306C. The signal processing 306A may implement the second processing path to execute the FFT operations, apply window functions, and extract the spectral features from the digitized signal data (spectrum data). The signal classification operation 306B may perform the comparison between extracted spectral features and known patterns in the pattern recognition database 240 or execute the ANN model 238 when pattern matching fails. The jammer mitigation 306C may implement countermeasures against detected interference sources, including frequency avoidance, spatial filtering through the MIMO antenna array 204, or adaptive thresholding to maintain operation in challenging RF environments. These three operational components work together to transform raw spectrum data into actionable signal intelligence.

In accordance with an embodiment, the operational layer 306 may further include training of the ANN model 238 for spectrum monitoring. The training of the ANN model 238 for spectrum monitoring may follow a structured approach that may integrate deep learning techniques with real-time RF signal processing. In an exemplary implementation, the ANN model 238 may be used for identifying recurring signal patterns at each event of the cross-band correlation. The ANN model 238 may enable adaptive spectrum analysis by leveraging a combination of deep learning, specifically using CNNs, LSTMs, and Transformer-based architectures to recognize complex RF signatures. The training process may include data acquisition and preprocessing, where the system 100 may use some test wireless communication devices (e.g., like the wireless communication devices 104A, 104B, 104C, . . . , 104N) and capture RF signals using a 4×4 MIMO antenna array, such as the MIMO antenna array 204, which may supports dual-polarization and operates from DC to 100 GHz or DC to 300 GHz. The signal filtering and conversion may be applied before digitization, using band-specific filtering to isolate signals of interest. Further, FFT and wavelet transforms may be used for spectral analysis, ensuring frequency-domain features are extracted. Thereafter, feature extraction may occur. The system 100 may apply multi-dimensional analysis combining spectral, temporal, and spatial processing to enhance detection accuracy. Further, MLO-based cross-band correlation may be used to align data from predefined frequency bands like the 5 GHz and 6 GHz bands. Further, features, such as modulation type, frequency components, interference patterns, and spatial signatures may be extracted. Thereafter, the ANN model 238 may be trained using labeled historical datasets stored in the pattern recognition database 240. The convolutional neural network (CNN) layers may be used to handle spatial features, while the Long short-term memory (LSTM) layers may be used for sequential pattern detection overtime. Further, to further enhance detection and classification of signals, transformer-based models may be deployed for contextual feature learning and adaptive anomaly detection. The federated learning techniques may be employed to enable distributed training across multiple nodes for real-time adaptation to obtain the trained ANN model 238.

In accordance with an embodiment, performance optimization to optimize network parameters may be carried out using Bayesian hyperparameter tuning. Further, Pruning, quantization, and knowledge distillation may help reduce computational overhead. The trained ANN model 238 may undergo real-time updates via online learning algorithms to adapt to new interference patterns. Examples of the online learning algorithms used may include Multi-Armed Bandit (MAB) Algorithms, Deep Q-Networks (DQN) for Spectrum Adaptation, or Incremental Learning (Online Backpropagation). Each node in the wireless mesh network 106 may contribute to global model updates (e.g., at the central cloud server 102) without sharing raw data. For example, learned interference features may be shared across different locations to enhance pattern recognition.

Furthermore, during execution, the trained ANN model 238 may process incoming RF data to detect signal anomalies, classify threats, and support dynamic spectrum reallocation. The system 100 may integrate edge computing for local signal classification and the central cloud server 102 (cloud ANN model) for large-scale anomaly detection. The trained ANN model 238 allows AI-enhanced spectrum monitoring enhanced real-time threat detection, dynamic signal classification, cross-band interference mitigation, and autonomous spectrum adaptation. By leveraging the Peltbeam's ANN model, such as the ANN model 238, wireless spectrum sensing, signal identification, and interference analysis may be significantly enhanced across a wide range of frequency bands (DC to 300 GHz).

In accordance with an embodiment, the processor 230 may be further configured to update one or more cognitive learning parameters of the ANN model 238 when the determined one or more signal patterns are not found in the pattern recognition database 240. The processor 230 may match newly determined signal patterns against known patterns stored in the pattern recognition database 240. Once the processor 230 identifies a signal pattern that does not correspond to any existing entry in the pattern recognition database 240 (e.g., if matching score below a predefined similarity threshold), the processor 230 may trigger an update sequence for the ANN model 238. In other words, when the processor 230 may perform similarity scoring between a newly detected pattern and all existing patterns in the pattern recognition database 240, a comprehensive match score may be calculated using the weighted Euclidean distance operation across multiple signal state representations. When the highest similarity score falls below the defined threshold (e.g., less than 0.75), the processor 230 may initiate the cognitive learning update sequence. First, the processor 230 may construct a new pattern template by extracting and normalizing the multi-state features from the unrecognized signal, including spectral density patterns, temporal sequences, phase relationships, and spatial characteristics. The new pattern template may serve as the foundation for a training dataset, which the processor 230 may augment with multiple instances of the pattern captured over time with varying signal conditions. The processor 230 may then execute a neural network update operation, using backpropagation to systematically adjust synaptic weights between neurons in the hidden layers, modify activation function parameters, and update bias values. Such gradient-descent-based learning process may minimize pattern recognition error by iteratively optimizing the network's parameters until convergence criteria are met. The updated neural network parameters are then validated against a test subset before the new pattern is committed or inserted into the pattern recognition database 240 with appropriate feature vectors and classification metadata. This continuous learning capability enables the wireless communication device 104A and the system 100 to autonomously adapt to emerging signal types and interference patterns without requiring manual reconfiguration or offline training.

Figure 4A:
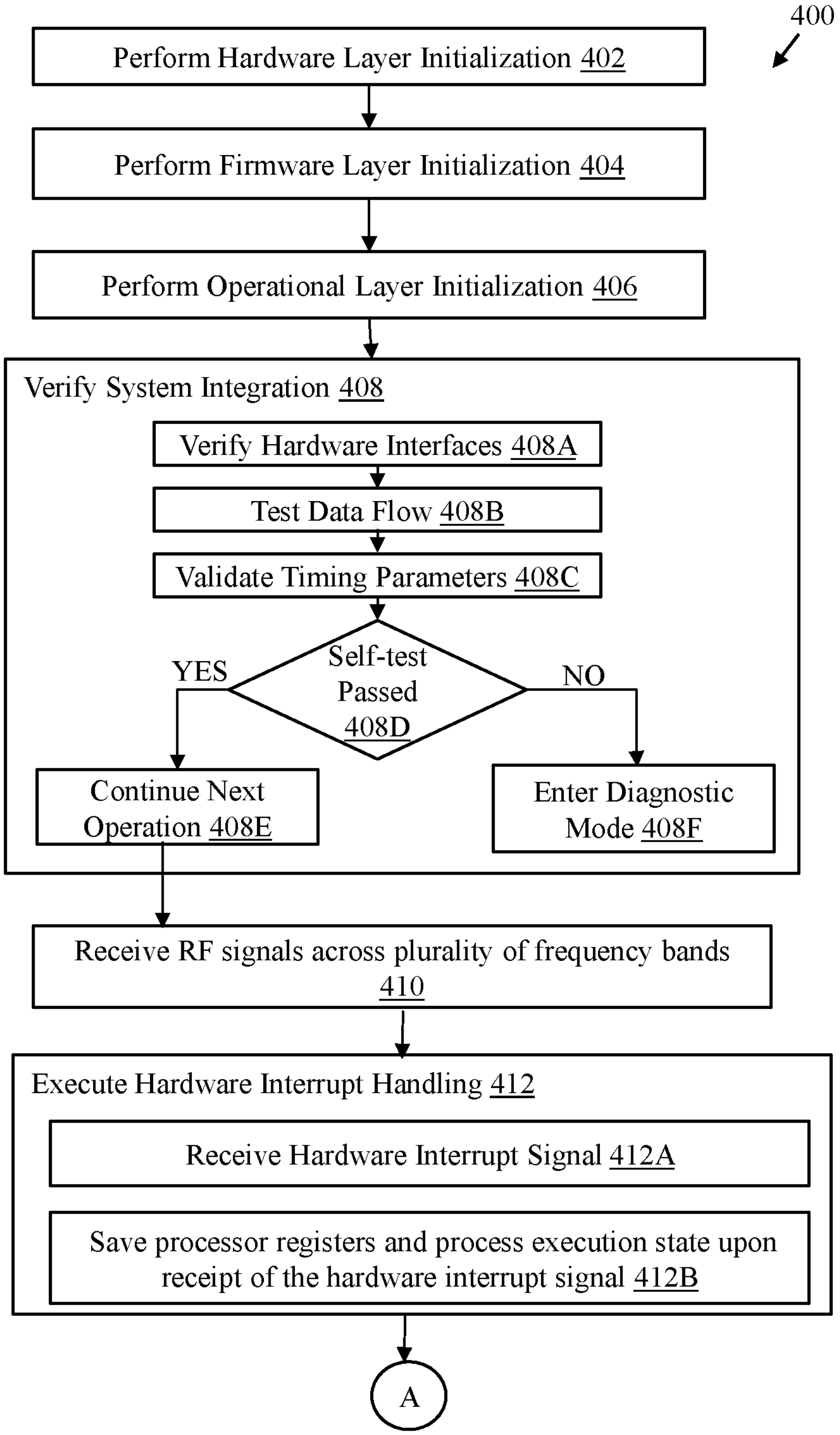
FIGS. 4A and 4B collectively, is a diagram that illustrates an exemplary scenario for implementation of a wireless communication device for spectrum monitoring based on dynamic configuration of radio frequency (RF) front-end, in accordance with an exemplary embodiment of the disclosure.
Figure 4B:
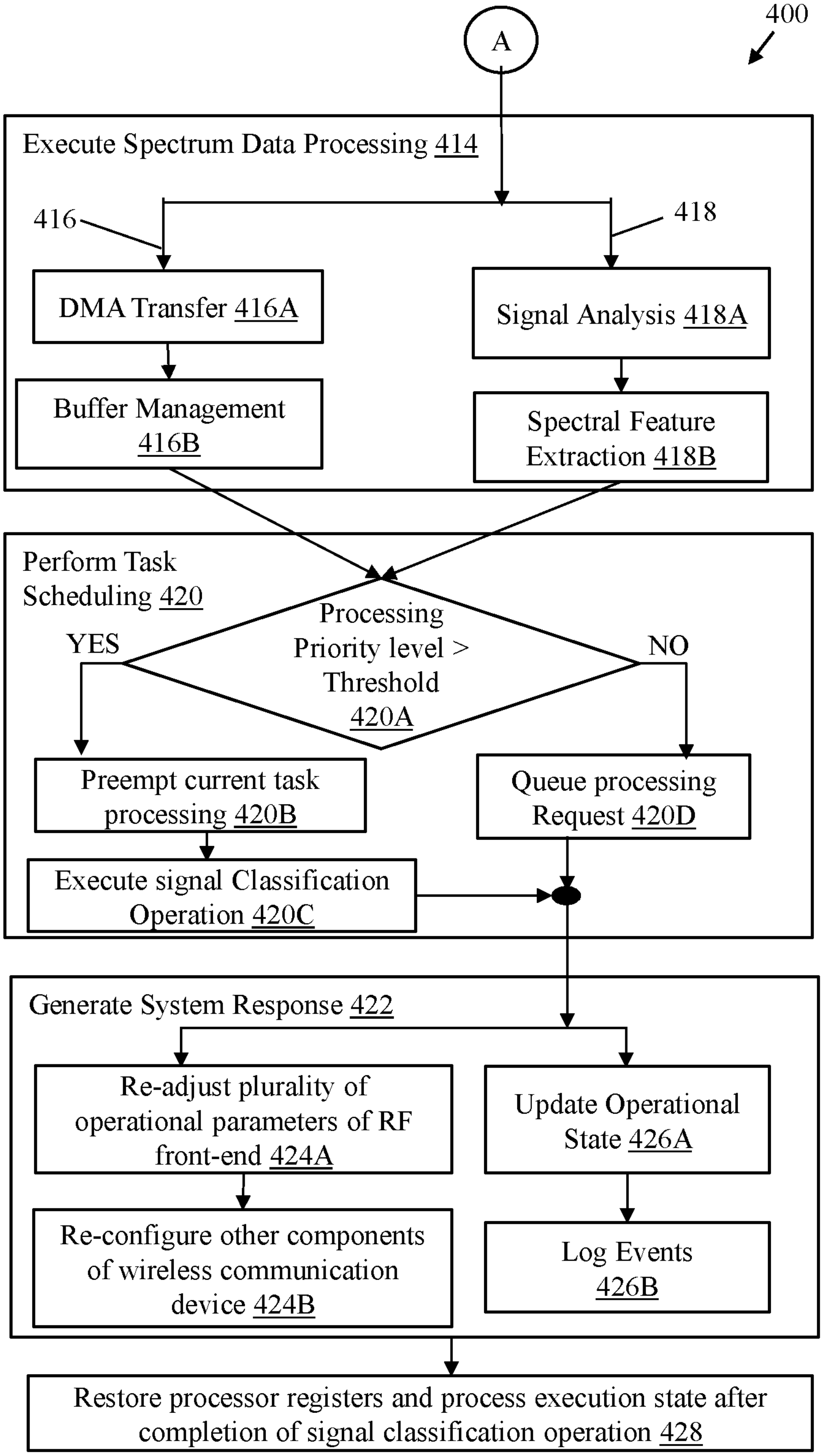
Figure 5A:
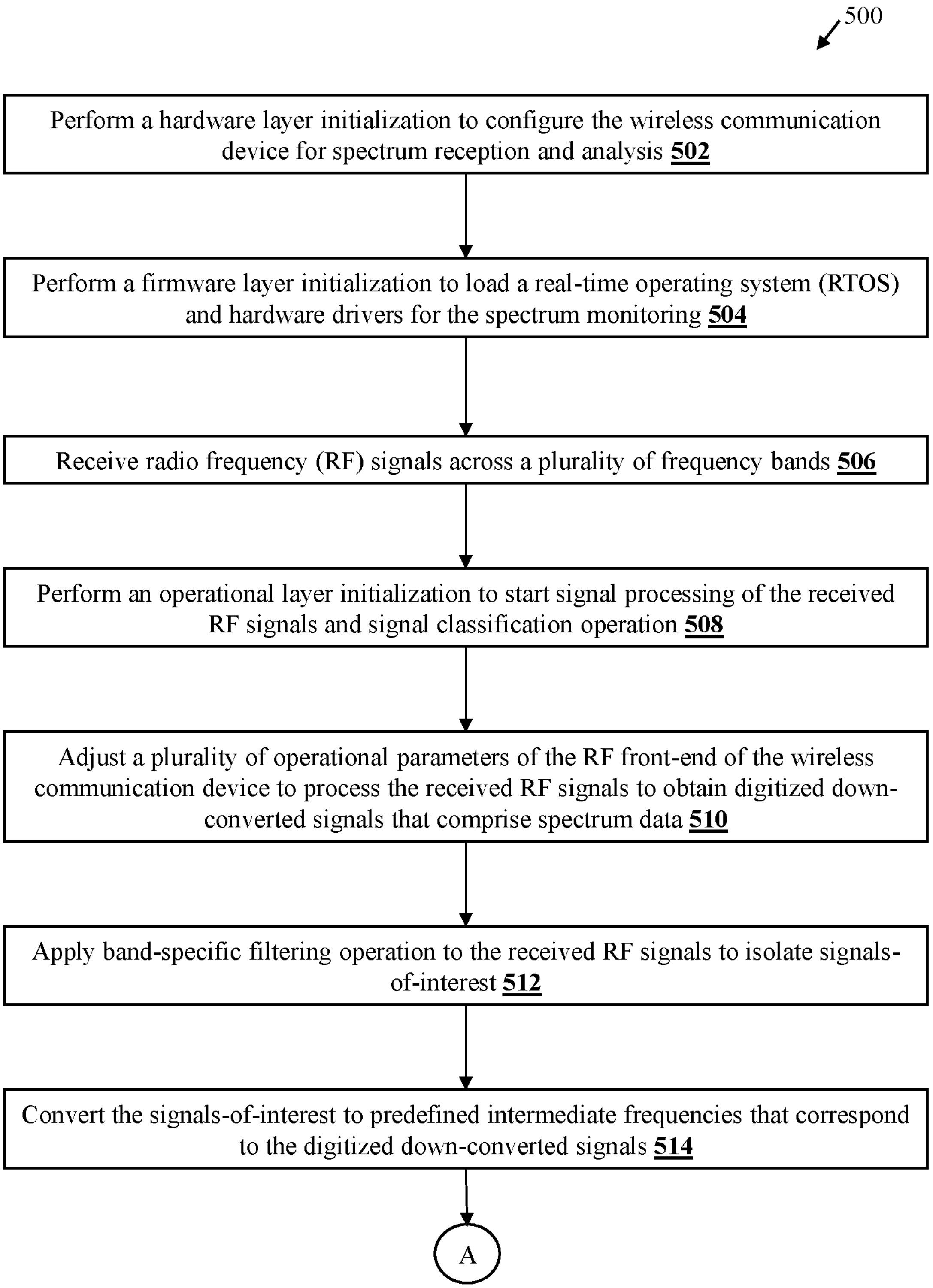
FIGS. 5A, 5B, 5C and 5D collectively, is a flowchart of a method for spectrum monitoring based on dynamic configuration of RF front-end, in accordance with an embodiment of the disclosure.
Figure 5B:
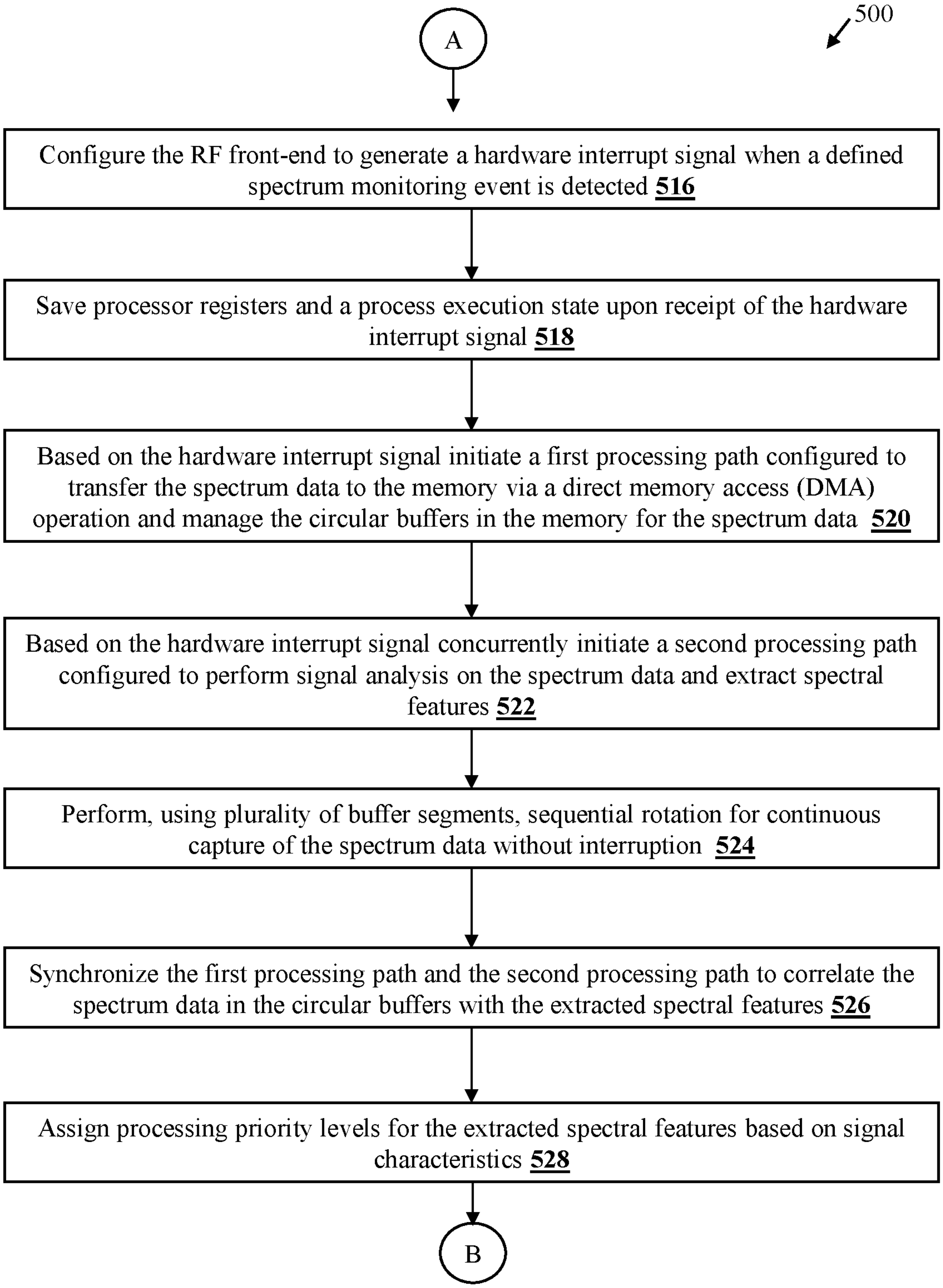
Figure 5C:
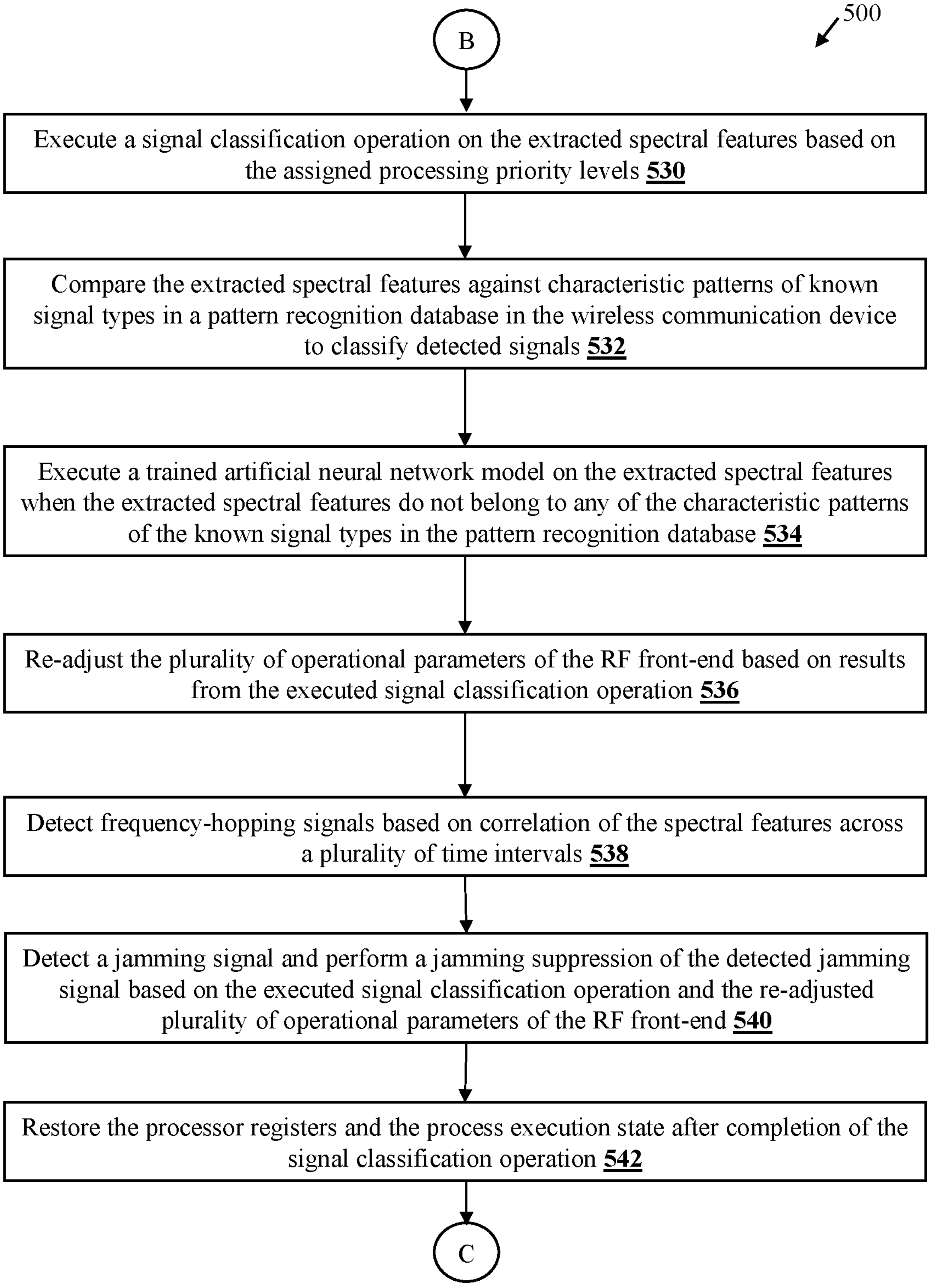
Figure 5D:
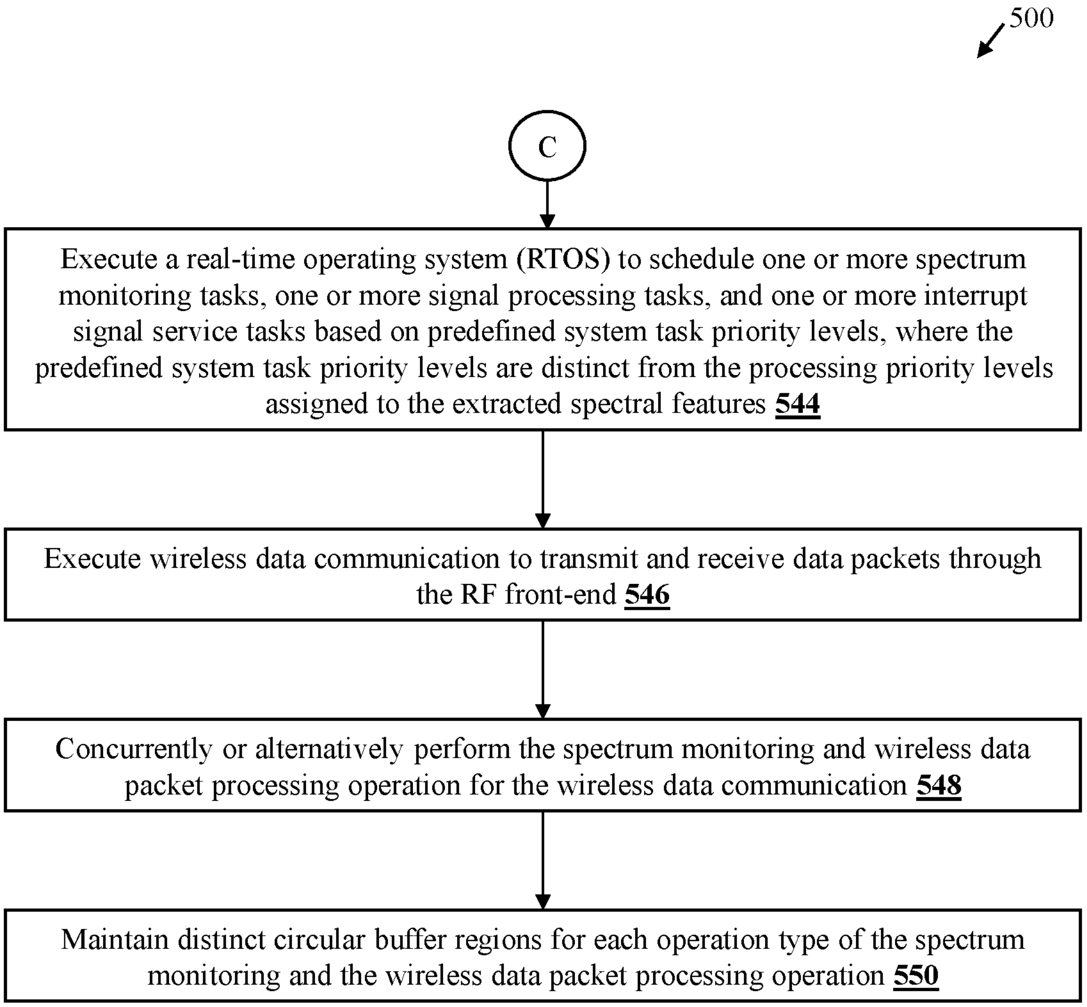

FIGS. 4A and 4B collectively, is a diagram that illustrates an exemplary scenario for implementation of a wireless communication device for spectrum monitoring based on dynamic configuration of radio frequency (RF) front-end, in accordance with an exemplary embodiment of the disclosure. FIGS. 4A and 4B are explained in conjunction with elements from FIGS. 1, 2 and 3. With reference FIGS. 4A and 4B, there is shown an exemplary signal processing pipeline using operations 402 to 420 to describe, for example, spectrum monitoring based on dynamic configuration of the RF front-end 208.

At 402, a hardware layer initialization may be performed. The hardware layer initialization may also be referred to as hardware initialization of the wireless communication device 104A. The processor 230 may be configured to perform the hardware layer initialization 402 to configure the wireless communication device 104A for spectrum reception and analysis. In this exemplary implementation, the hardware layer initialization may include four sequential steps. First, the processor 230 may initialize the WLAN chipset (e.g., Wi-Fi® 7 hardware) by powering up the chipset, performing built-in self-tests, and enabling the core clock distribution network. Second, the processor 230 may configure the RF front-end 208 by setting power levels for the LNA 210 (e.g., setting initial gain to 18 dB), programming the plurality of different filters 212 with initial bandpass characteristics (e.g., configuring a 5 GHz bandpass filter with 320 MHz bandwidth), and setting the LO 214 to generate specific frequencies for the mixer 216 (e.g., programming the fractional-N synthesizer to generate a 5.5 GHz local oscillator signal). Third, the processor 230 may setup the ADC/DAC interfaces by configuring initial sampling rates (e.g., 640 MSPS for Wi-Fi® 7 channels), bit depths (e.g., 12-bit resolution), and timing parameters (e.g., 50% duty cycle clock) for digitizing the received RF signals. Fourth, the processor 230 may initialize digital processing blocks by configuration of Fast Fourier Transform (FFT) accelerators (e.g., setting up 4096-point FFT engines), enabling digital signal processing (DSP) cores (e.g., the processor 230) for signal processing, and allocation of memory regions in the memory 232 for digital signal processing operations. During digital processing initialization, the processor 230 may configure the FFT hardware accelerators with specific parameters optimized for spectrum monitoring. These configurations may include setting the FFT size (typically 1024, 2048, or 4096 points), where larger sizes may provide finer frequency resolution at the cost of increased processing time. The processor 230 may program the FFT engine to use specific windowing functions (e.g., Hanning, Blackman-Harris, or Kaiser) to minimize spectral leakage effects when analyzing signals with diverse characteristics. Additionally, the processor 230 may configure FFT overlap settings (e.g., 50% or 75%) to ensure continuous frequency coverage across buffer boundaries, preventing missed transient signals. For real-time processing, the processor 230 may establish cascaded FFT processing pipelines where multiple FFT operations occur simultaneously on different data segments.

At 404, a firmware layer initialization may be performed. The firmware layer initialization may also be referred to as firmware setup in the wireless communication device 104A. In this exemplary implementation, the firmware layer initialization may be performed to load the RTOS 236 and hardware drivers for the spectrum monitoring. For example, the processor 230 may first load the RTOS 236 by transferring a 64 KB kernel image from non-volatile memory, such as the memory 232, to a random-access memory (RAM) and initializing a task control block, for example, with eight to ten priority levels specifically configured for spectrum monitoring operations. Next, the processor 230 may initialize hardware drivers by loading and configuring the RF front-end driver that may include register maps for accessing the plurality of different filters 212 and the LNA 210. During the third step, the processor 230 may setup DMA channels by configuring channel 0 with a base address of, for example, "0×40000000", a buffer size of 16 MB divided into four 4 MB segments, and enabling wraparound mode with bit 7 in the control register (0×01C0) set to "1". The wraparound mode enablement may refer to the configuration of specific control registers in the DMA controller that may activate the functionality of the circular buffers 234. This may be accomplished by setting designated control bits (e.g., bit 7 in a DMA control register) that instruct the DMA controller to automatically reset its destination address pointer to the beginning of the defined buffer region upon reaching the end address. Finally, the processor 230 may configure interrupts by setting the interrupt vector table base address, for example, to "0×20000000" and programming the interrupt controller to assign DMA completion interrupts to priority level "2", thereby ensuring that buffer processing begins immediately upon segment completion while allowing higher-priority tasks to pre-empt if needed.

At 406, an operational layer initialization may be performed. The operational layer initialization may also be referred to as software initialization in the wireless communication device 104A. The operational layer initialization may be performed to start signal processing of received RF signals and signal classification operation. In this exemplary implementation, the operational layer initialization may include three parallel initialization paths that may be executed concurrently to optimize startup time. First, the processor 230 may initialize signal processing by loading optimized digital signal processing instructions into the memory 232 and configuring processing parameters. For example, the processor 230 may initialize FFT processing instructions with specific window functions (e.g., Blackman-Harris window coefficients loaded to address 0×60000), configure correlation algorithms with detection thresholds (e.g., setting a noise floor threshold of −85 dBm), and establish feature extraction parameters (e.g., defining 16 spectral features to be extracted from each signal). Second, the processor 230 may load the pattern recognition database 240 into the memory 232. The loading of the pattern recognition database 240 may involve loading a structured database of signal fingerprints from non-volatile storage, such as the memory 232 into high-speed memory regions, such as RAM, for rapid access during classification operations. The pattern recognition database 240 may include characteristic patterns for hundreds of signal types, each defined by multiple feature vectors and classification metadata. Third, the processor 230 may setup jammer mitigation settings by initializing parameter sets for detecting and suppressing interference. This may include configuring spatial filtering coefficients for the MIMO antenna array 204, loading signature patterns of known jamming signals, and initializing the adaptive threshold operation that may distinguish between legitimate signals and potential jammers. The initializing of the adaptive threshold operation may involve configuring dynamic detection parameters that automatically adjust based on the observed RF environment. During jammer mitigation setup, the processor 230 may establish baseline threshold values (e.g., starting at 6 dB above the measured noise floor) that may serve as initial detection references for different frequency bands. The processor 230 may then configure adaptation parameters including adjustment rates (e.g., 0.5 dB increments), environmental response times (typically 50-500 ms), and stability factors that prevent rapid threshold oscillation. The initialization may include establishing separate threshold profiles for different signal types, frequency bands, and operational scenarios. This parallel initialization approach may enable efficient preparation of operational components for spectrum monitoring before activation of the interrupt-driven processing architecture.

At 408, system integration may be verified. In accordance with an embodiment, after the hardware layer initialization 402, the firmware layer initialization 404, and the operational layer initialization 406, the processor 230 may be further configured to perform system integration verification to ensure proper coordination between all system components in the wireless communication device 104A before beginning spectrum monitoring operations. In the system integration verification, one or more sub-operations, such as operations 408A to 408F, may be performed.

At 408A, hardware interfaces may be verified. First, the processor 230 may verify hardware interfaces by testing communication paths between the RF front-end 208, the memory 232, and the digital processing components. The processor 230 may execute specific test sequences to confirm that control signals, data paths, and interrupt lines function correctly between hardware components. This verification may ensure that the processor 230 may properly configure the RF front-end 208 and receive hardware interrupt signals when defined spectrum monitoring events are detected.

At 408B, data flow may be tested. The processor 230 may test data flow by initiating test transfers through the DMA controller to verify that the spectrum data may move correctly from the RF front-end 208 to the circular buffers 234 in the memory 232. The processor 230 may confirm that buffer management operations function correctly, including the sequential rotation of buffer segments for continuous data capture. This test may validate that both the first processing path and second processing path can access spectrum data without conflicts.

At 408C, timing parameters may be validated. The processor 230 may validate the timing parameters by measuring timing relationships that may include a response latency of the hardware interrupt signal, a context switching time, and a processing path synchronization. The processor 230 may verify that time-bound operations complete within required deadlines to ensure real-time spectrum monitoring capabilities are maintained. This timing validation may confirm that the concurrent processing of the first processing path and the second processing path may maintain continuous monitoring without data loss.

At 408D, it may be checked if self-test is passed or not. The processor 230 may execute a comprehensive self-test sequence that may evaluate whether the system integration in the wireless communication device 104A is successful. The self-test may verify that both processing paths (i.e., the first processing path and the second processing path) may execute concurrently without resource conflicts. The self-test may further verify that the hardware interrupt signal generation may function correctly (i.e., as per defined settings) for defined spectrum monitoring events, and that the signal classification operations may generate expected results for test input patterns. The self-test may include verification that the RF front-end 208 may implement parameter adjustments as instructed by the processor 230, thereby confirming the closed-loop feedback capability of the wireless communication device 104A.

In a case where the self-test is passed, the control moves to 408E. In a case where the self-test is not passed, the control moves to 408F. At 408E, the wireless communication device 104A may continue to next operation when the self-test is passed. At 408F, the wireless communication device 104A may enter diagnostic mode when the self-test is not passed. In such a case, the control may move back to operation 402, 404, or 406 based on the diagnostics results in the diagnostic mode. In diagnostic mode, the processor 230 may identify specific failure points and may recursively re-initialize appropriate layers (hardware, firmware, or operational layers) based on diagnostic results before attempting system integration verification again. Such rigorous verification process may ensure reliable spectrum monitoring operation before the system begins processing live RF signals.

At 410, RF signals across plurality of frequency bands may be received. In an implementation, the plurality of frequency bands may range from DC to 300 GHz for spectrum monitoring.

At 412, hardware interrupt handling may be executed. The operation 412 may include one or more sub-operations, such as operations 412A and 412B. At 412A, hardware interrupt signal may be received. The processor 230 may receive the hardware interrupt signal generated by the RF front-end 208 when one of the predefined spectrum monitoring events occurs, such as signal power that may exceed a threshold or a buffer fill level that may reach a predetermined value. At 412B, the processor registers 302B and a process execution state may be saved upon receipt of the hardware interrupt signal. This context saving operation may preserve all general-purpose registers, status flags, program counter, and other architectural state information to enable later restoration of the interrupted process. The interrupt handling mechanism may enable the wireless communication device 104A to temporarily suspend current operations, process spectrum data via the two concurrent processing paths at operation 414 and later resume the interrupted process seamlessly after spectrum analysis completes.

At 414, spectrum data processing may be executed. The spectrum data processing may be initiated by bifurcation in two concurrent processing paths. Based on the hardware interrupt signal, a first processing path 416 configured to transfer the spectrum data to the memory 232 via a direct memory access (DMA) operation (referred to as DMA transfer 416A) and manage the circular buffers 234 (referred to as buffer management 416B) in the memory 232 for the spectrum data, may be initiated. Further, based on the hardware interrupt signal, a second processing path 418 configured to perform signal analysis 418A on the spectrum data and extraction of spectral features 418B, may be initiated. This implementation may overcome significant technical challenges in resource contention, memory coherency, and inter-path synchronization that enable deterministic performance despite the complex concurrent operation.

At 420, task scheduling operation may be performed. In the task scheduling operation, processing priority levels may be assigned for the extracted spectral features based on signal characteristics. The operation 420 may include one or more sub-operations, such as operations 420A to 420C. At 420A, it may be checked if a processing priority level is greater than a threshold. In a case where the processing priority level is greater than the threshold, the control may pass to 420B or else to 420D. For the spectral features with priority levels below the threshold, the processor 230 may instead queue the processing request (at 420D) for later execution when resources become available. This dynamic priority-based scheduling mechanism may improve system responsiveness to potentially critical signals (such as jammers or unauthorized transmissions) while maintaining efficient resource utilization for routine signal processing, enabling the wireless communication device 104A to operate effectively even in environments with numerous simultaneous signals of varying importance. At 420B, current task processing may be preempted. In this case, the processor 230 may forcibly suspend execution of a lower-priority task that may be currently using processor resources. The processor 230 may save the execution context of this task (similar to interrupt handling) and immediately reallocate computational resources to process the high-priority spectral features. This preemption capability, built into the RTOS 236, may ensure that time-critical signal analysis occurs without waiting for lower-priority tasks to be completed as per queue. At 420C, signal classification operation may be executed. For high-priority features (i.e., greater than the threshold), the classification may occur immediately after preemption to minimize the response time to potentially critical signals. This prioritized execution mechanism may enable the wireless communication device 104A to rapidly identify and respond to signals of interest (such as potential jammers, unauthorized transmissions, or emergency communications) with minimal latency, while still maintaining efficient resource utilization for routine signal processing that can occur during less time-critical periods.

At 422, system response may be generated. The system response may include two concurrent processing paths where one processing path may include operations 424A and 424B and the other processing path may include operations 426A and 426B.

At 424A, the plurality of operational parameters of the RF front-end 208 may be re-adjusted. For example, when a frequency-hopping signal is classified, the processor 230 may reconfigure the LO 214 to track the detected hopping pattern by writing specific prediction values to the frequency synthesizer registers (e.g., adjusting a defined register (e.g., "0×2060") with values computed to match the next hop frequency). Concurrently, the processor 230 may reduce the bandwidth of the plurality of different filters 212 to focus on the specific hopping channels by writing new values to the bandwidth control register (e.g., changing register 0×2052 from 0×03 to 0×01 to reduce bandwidth from 100 MHz to 20 MHz). For weak signals of interest, the processor 230 may increase the gain of the LNA 210 by writing a higher value to the gain control register (e.g., changing register 0×2040 from 0×02 to 0×06 to increase gain from 10 dB to 25 dB).

At 424B, other components of wireless communication device 104A may be re-configured. For instance, the processor 230 may reconfigure the MIMO antenna array 204 to implement spatial filtering that may improve reception of RF signals from the direction of detected signals of interest. This may involve adjusting phase relationships between different antenna elements by writing specific values to antenna control registers (e.g., writing 0×4C to register 0×3080 to create a directed beam pattern toward 450 azimuth where a signal of interest was detected). The processor 230 may also reallocate memory resources by adjusting the circular buffer configuration to dedicate larger buffer segments to frequency bands where significant activity was detected.

At 426A, an operational state may be updated concurrently to the re-adjustment of the plurality of operational parameters of the RF front-end 208. For example, the signal detection thresholds may be updated based on the current RF environment (e.g., increase of detection thresholds by 3 dB in frequency bands with high noise levels), modification of operation parameters based on observed signal patterns (e.g., update of frequency hopping pattern prediction coefficients), and adjustment of classification confidence thresholds based on detection statistics (e.g., lowering match thresholds for consistently detected signal types). At step 426B, the processor 230 may log events. For example, significant events may be logged to the memory 232, including detailed records of classified signals (e.g., logging "Bluetooth signal detected at 2442 MHz, −65 dBm, at 14:32: 04.56"), potential threats (e.g., "Unknown wideband signal detected at 5350-5500 MHz, power 12 dB above baseline"), and system responses (e.g., "Reconfigured LNA gain to 28 dB and filter bandwidth to 80 MHz at 5400 MHz center frequency").

At 428, the processor registers 302B and the process execution state may be restored after completion of signal classification operation. The restoration may be the final phase of the interrupt handling cycle that began with saving the processor state when the hardware interrupt signal was initially received (e.g. at operation 412A of FIG. 4A). The processor 230 may retrieve all previously saved register values from the dedicated memory region stored during operation 412B. For example, if a wireless data transmission process was interrupted with the program counter at address 0×24680 and general-purpose registers R0-R15 containing specific values for packet processing, the processor 230 may reload these exact register values from the saved state. This context restoration may enable the wireless communication device 104A to maintain wireless communication functionality while periodically or continuously performing spectrum monitoring operations, allowing the wireless communication device 104A to seamlessly perform dual roles.

FIGS. 5A, 5B, 5C and 5D collectively, is a flowchart of a method for spectrum monitoring based on dynamic configuration of RF front-end, in accordance with an embodiment of the disclosure. FIGS. 5A, 5B, 5C and 5D are explained in conjunction with elements from FIGS. 1, 2, 3, 4A and 4B. With reference to 5A, 5B, 5C and 5D, there is shown a flowchart of a method 500 comprising exemplary operations 502 through 550. The method 500 may be implemented in any of the wireless communication devices 104A, 104B, 104C, . . . , 104N.

At 502, the hardware layer initialization 402 may be performed to configure the wireless communication device 104A for spectrum reception and analysis.

At 504, the firmware layer initialization 404 may be performed to load the real-time operating system (RTOS) 236 and hardware drivers (e.g., the custom hardware drivers 304A) for the spectrum monitoring.

At 506, radio frequency (RF) signals may be received across a plurality of frequency bands.

At 508, the operational layer initialization 406 may be performed to start signal processing of the received RF signals and signal classification operation.

At 510, a plurality of operational parameters of the RF front-end 208 of the wireless communication device 104A may be adjusted to process the received RF signals to obtain digitized down-converted signals that comprise spectrum data.

At 512, band-specific filtering operation may be applied to the received RF signals to isolate signals-of-interest.

At 514, the signals-of-interest may be converted to predefined intermediate frequencies that correspond to the digitized down-converted signals.

At 516, the RF front-end 208 may be configured to generate a hardware interrupt signal when a defined spectrum monitoring event is detected.

At 518, the processor registers 302B and a process execution state (i.e., a current process execution state) may be saved upon receipt of the hardware interrupt signal.

At 520, based on the hardware interrupt signal, the first processing path 416 configured to transfer the spectrum data to the memory 232 via a direct memory access (DMA) operation and manage the circular buffers 234 in the memory 232 for the spectrum data, may be initiated.

At 522, based on the hardware interrupt signal, a second processing path configured to perform signal analysis on the spectrum data and extract spectral features, may be concurrently initiated.

At 524, sequential rotation for continuous capture of the spectrum data may be performed without interruption using the plurality of buffer segments 234A.

At 526, the first processing path 416 and the second processing path 418 may be synchronized to correlate the spectrum data in the circular buffers 234 with the extracted spectral features.

At 528, processing priority levels for the extracted spectral features may be assigned based on signal characteristics.

At 530, a signal classification operation may be executed on the extracted spectral features based on the assigned processing priority levels.

At 532, the extracted spectral features may be compared against characteristic patterns of known signal types in the pattern recognition database 240 in the wireless communication device 104A to classify detected signals.

At 534, the trained ANN model 238 may be executed on the extracted spectral features when the extracted spectral features do not belong to any of the characteristic patterns of the known signal types in the pattern recognition database 240.

At 536, the plurality of operational parameters of the RF front-end 208 may be re-adjusted based on results from the executed signal classification operation.

At 538, frequency-hopping signals may be detected based on correlation of the spectral features across a plurality of time intervals.

At 540, a jamming signal may be detected, and a jamming suppression of the detected jamming signal may be performed based on the executed signal classification operation and the re-adjusted plurality of operational parameters of the RF front-end 208.

At 542, the processor registers 302B and the process execution state may be restored after completion of the signal classification operation.

At 544, the RTOS 236 may be executed to schedule one or more spectrum monitoring tasks, one or more signal processing tasks, and one or more interrupt signal service tasks based on predefined system task priority levels, where the predefined system task priority levels may be distinct from the processing priority levels assigned to the extracted spectral features.

At 546, wireless data communication may be executed to transmit and receive data packets through the RF front-end 208.

At 548, the spectrum monitoring and wireless data packet processing operation for the wireless data communication may be concurrently or alternatively performed.

At 550, distinct circular buffer regions may be maintained for each operation type of the spectrum monitoring and the wireless data packet processing operation.

Various embodiments of the disclosure may provide the wireless communication device 104A. The wireless communication device 104A may include one or more antenna arrays 202 configured to receive radio frequency (RF) signals across a plurality of frequency bands. The wireless communication device 104A may further include the RF front-end 208 coupled to the one or more antenna arrays 202. The wireless communication device 104A may further include the memory 232 configured to store the circular buffers 234. The wireless communication device 104A may further include the processor 230 configured to adjust a plurality of operational parameters of the RF front-end 208 to process the received RF signals to obtain digitized down-converted signals that comprise spectrum data. The processor 230 may be further configured to configure the RF front-end 208 to generate a hardware interrupt signal when a defined spectrum monitoring event is detected. Based on the hardware interrupt signal, the processor 230 may be further configured to initiate a first processing path configured to transfer the spectrum data to the memory 232 via a direct memory access (DMA) operation and manage the circular buffers 234 in the memory 232 for the spectrum data. Based on the hardware interrupt signal, the processor 230 may be further configured to concurrently initiate a second processing path configured to perform signal analysis on the spectrum data and extract spectral features. The processor 230 may be further configured to assign processing priority levels for the extracted spectral features based on signal characteristics. The processor 230 may be further configured to execute a signal classification operation on the extracted spectral features based on the assigned processing priority levels. The processor 230 may be further configured to re-adjust the plurality of operational parameters of the RF front-end based on results from the executed signal classification operation.

Various embodiments of the disclosure may provide a computer program product for spectrum monitoring, the computer program product comprising a non-transitory computer-readable storage medium having program instructions embodied therewith, the program instructions are executable by a system to cause the system to execute operations, the operations comprising receive radio frequency (RF) signals across a plurality of frequency bands. The operations may further include adjusting a plurality of operational parameters of the RF front-end 208 to process the received RF signals to obtain digitized down-converted signals that comprise spectrum data. The operations may further include configuring the RF front-end 208 to generate a hardware interrupt signal when a defined spectrum monitoring event is detected. The operations may further include initiating a first processing path configured to transfer the spectrum data to the memory 232 via a direct memory access (DMA) operation and managing the circular buffers 234 in the memory 232 for the spectrum data, based on the hardware interrupt signal. The operations may further include concurrently initiating a second processing path configured to perform signal analysis on the spectrum data and extract spectral features, based on the hardware interrupt signal. The operations may further include assigning processing priority levels for the extracted spectral features based on signal characteristics. The operations may further include executing a signal classification operation on the extracted spectral features based on the assigned processing priority levels. The operations may further include re-adjusting the plurality of operational parameters of the RF front-end based on results from the executed signal classification operation.

While various embodiments described in the present disclosure have been described above, it should be understood that they have been presented by way of example, and not limitation. It is to be understood that various changes in form and detail can be made therein without departing from the spirit and scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in computer-readable storage medium such as a non-transitory computer-readable medium configured to store the software. Such software can enable, for example, the function, fabrication, modeling, simulation, description and/or testing of the apparatus and methods described herein. For example, this can be accomplished using general program languages (e.g., C, C++), hardware description languages (HDL) including Verilog HDL, VHDL, and so on, or other available programs. Such software can be disposed of in any known computer-readable storage medium such as non-transitory computer-readable medium, such as semiconductor, magnetic disc, or optical disc (e.g., CD-ROM, DVD-ROM, etc.). The software can also be disposed of as computer data embodied in a computer-readable storage medium such as non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the Internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

Various aspects of the present disclosure are described by narrative text, flowcharts, diagrams of computer systems and/or diagrams of the machine logic included in various computer program product (CPP) embodiments. With respect to any flowchart, depending upon the technology involved, the operations can be performed in a different order than what is shown in the flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

What is claimed is:

1. A method for spectrum monitoring, comprising:

in a wireless communication device:

capturing radio frequency (RF) signals using a multiple-input-multiple-output (MIMO) antenna array;

applying band-specific filtering to the captured RF signals before digitization to isolate signals of interest;

performing spectral analysis on the signals of interest using Fast Fourier Transform (FFT) and wavelet transforms to extract frequency-domain features;

applying multi-dimensional analysis combining spectral, temporal, and spatial processing on the frequency-domain features to extract features;

comparing the extracted features against characteristic patterns of known signal types in a pattern recognition database; and executing an artificial neural network (ANN) model on the extracted features to determine a signal classification when the extracted features do not belong to the characteristic patterns of the known signal types in the pattern recognition database.

2. The method of claim 1, wherein the features comprise modulation type, frequency components, interference patterns, and spatial signatures.

3. The method of claim 1, wherein the ANN model comprises convolutional neural network (CNN) layers to handle spatial features and long short-term memory (LSTM) layers for sequential pattern detection over time.

4. The method of claim 1, further comprising training the ANN model based on labeled historical datasets stored in the pattern recognition database.

5. The method of claim 1, wherein the applying of the multi-dimensional analysis comprises using multi-link operation (MLO)-based cross-band correlation to align data from predefined frequency bands.

6. The method of claim 1, further comprising processing incoming RF data using the ANN model to detect signal anomalies and classify threats.

7. The method of claim 1, wherein the MIMO antenna array supports dual-polarization and operates from direct current (DC) to 300 gigahertz (GHz).

8. The method of claim 1, further comprising triggering an update sequence for the ANN model when the extracted features do not correspond to any existing entry in the pattern recognition database.

9. The method of claim 8, wherein the triggering of the update sequence comprises:

constructing a new pattern template by extracting and normalizing multi-state features from an unrecognized signal, the multi-state features including spectral density patterns, temporal sequences, phase relationships, and spatial characteristics; augmenting the new pattern template with multiple instances of a pattern over time with varying signal conditions to form a training dataset; and executing a neural network update operation on the ANN model based on the training dataset, wherein the executing uses backpropagation to adjust synaptic weights between neurons in hidden layers, modify activation function parameters, and update bias values.

10. The method of claim 1, wherein the comparing of the extracted features against the characteristic patterns comprises performing similarity scoring between a newly detected pattern and the characteristic patterns in the pattern recognition database using a weighted Euclidean distance operation across multiple signal state representations.

11. The method of claim 10, wherein the executing of the ANN model is when a highest similarity score among similarity scores between the newly detected pattern and the characteristic patterns falls below a defined threshold.

12. The method of claim 1, wherein the pattern recognition database stores the characteristic patterns of the known signal types, and each of the characteristic patterns includes multiple feature vectors representing expected spectral, temporal, and modulation characteristics of the known signal types.

13. A wireless communication device for spectrum monitoring, comprising:

a multiple-input-multiple-output (MIMO) antenna array configured to capture radio frequency (RF) signals;

an RF front-end coupled to the MIMO antenna array and configured to apply band-specific filtering to the captured RF signals before digitization to isolate signals of interest;

a memory configured to store a pattern recognition database; and a processor configured to:

perform spectral analysis on the signals of interest using Fast Fourier Transform (FFT) and wavelet transforms to extract frequency-domain features;

apply multi-dimensional analysis combining spectral, temporal, and spatial processing on the frequency-domain features to extract features;

compare the extracted features against characteristic patterns of known signal types in the pattern recognition database; and execute an artificial neural network (ANN) model on the extracted features to determine a signal classification when the extracted features do not belong to the characteristic patterns of the known signal types in the pattern recognition database.

14. The wireless communication device of claim 13, wherein the features comprise modulation type, frequency components, interference patterns, and spatial signatures.

15. The wireless communication device of claim 13, wherein the ANN model comprises convolutional neural network (CNN) layers to handle spatial features and long short-term memory (LSTM) layers for sequential pattern detection over time.

16. The wireless communication device of claim 13, wherein the processor is further configured to train the ANN model based on labeled historical datasets stored in the pattern recognition database.

17. The wireless communication device of claim 13, wherein the multi-dimensional analysis comprises using multi-link operation (MHLO)-based cross-band correlation to align data from predefined frequency bands.

18. The wireless communication device of claim 13, wherein the processor is further configured to process incoming RF data using the ANN model to detect signal anomalies and classify threats.

19. The wireless communication device of claim 13, wherein the MIMO antenna array supports dual-polarization and operates from direct current (DC) to 300 gigahertz (GHz).

20. The wireless communication device of claim 13, wherein the processor is further configured to trigger an update sequence for the ANN model when the extracted features do not correspond to any existing entry in the pattern recognition database.

* * * * *